US012166950B2

(12) United States Patent
Ito

(10) Patent No.: US 12,166,950 B2
(45) Date of Patent: Dec. 10, 2024

(54) STEREOSCOPIC OPTICAL SYSTEM AND IMAGE PICKUP APPARATUS

(71) Applicant: CANON KABUSHIKI KAISHA, Tokyo (JP)

(72) Inventor: Daisuke Ito, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 45 days.

(21) Appl. No.: 18/318,034

(22) Filed: May 16, 2023

(65) Prior Publication Data

US 2023/0388476 A1 Nov. 30, 2023

(30) Foreign Application Priority Data

May 25, 2022 (JP) ................................ 2022-085440

(51) Int. Cl.

| | |
|---|---|
| ***G02B 7/10*** | (2021.01) |
| ***H04N 13/204*** | (2018.01) |
| ***H04N 23/67*** | (2023.01) |
| ***H04N 23/69*** | (2023.01) |

(52) U.S. Cl.

CPC ............. *H04N 13/204* (2018.05); *G02B 7/10* (2013.01); *H04N 23/67* (2023.01); *H04N 23/69* (2023.01)

(58) Field of Classification Search

CPC ....................................................... G02B 7/10

See application file for complete search history.

(56) References Cited

U.S. PATENT DOCUMENTS

| | | | | |
|---|---|---|---|---|
| 6,219,182 | B1 * | 4/2001 | McKinley | G02B 7/16 359/821 |
| 9,069,156 | B2 | 6/2015 | Ito | |
| 10,634,878 | B2 | 4/2020 | Ito | |
| 11,067,779 | B2 | 7/2021 | Ito | |

FOREIGN PATENT DOCUMENTS

| | | |
|---|---|---|
| JP | 2013-222177 A | 10/2013 |
| JP | 2020-008629 A | 1/2020 |

* cited by examiner

*Primary Examiner* — Jeffery A Williams

(74) *Attorney, Agent, or Firm* — Carter, DeLuca & Farrell LLP

(57) ABSTRACT

A stereoscopic optical system includes two optical systems disposed in parallel. Each of the two optical systems includes a plurality of lens units and two reflective surfaces disposed on an image side of the plurality of lens units. A distance between adjacent lens units in each of the two optical systems changes during zooming. A distance between optical axes of the two optical systems is narrower on the image side of the two reflective surfaces than on an object side of the two reflective surfaces. A predetermined condition is satisfied.

19 Claims, 13 Drawing Sheets

STEREOSCOPIC OPTICAL SYSTEM AND IMAGE PICKUP APPARATUS

BACKGROUND

Technical Field

One of the aspects of the disclosure relates to an optical system suitable to capture a stereoscopically viewable image (stereoscopic image).

Description of Related Art

Some stereoscopic optical systems that enable a stereoscopic image to be acquired by imaging use two optical systems placed in parallel (juxtaposed) so as to have a parallax. Japanese Patent Laid-Open No. (JP) 2020-8629 discloses a stereoscopic optical system that includes two optical systems (fisheye lenses) disposed in parallel and two reflective surfaces provided in each optical system to bend its optical path. The bent optical paths can secure a base length between object-side lens units in the two optical systems, and narrow the distance between image-side lens units so that image circles of the two optical systems can be formed on a single image sensor.

Such a stereoscopic optical system is demanded to have a configuration that can provide magnification variation (zooming) from a wide-angle state that can provide imaging of a wide range of scenery, etc., to a telephoto state that can provide imaging by enlarging a specific object (target).

JP 2013-222177 discloses a stereoscopic optical system in which two object-side optical systems disposed in parallel are configured as zoom lenses that can provide magnification variation.

In the stereoscopic optical system disclosed in JP 2013-222177, a uniform image height is set from the wide-angle end to the telephoto end, and the zoom lens has a power arrangement suitable for the uniform image height. Therefore, the overall lens length at the telephoto end is long due to restrictions on the image height at the telephoto end, and this stereoscopic optical system is large.

SUMMARY

One of the aspects of the present disclosure provides a stereoscopic optical system that is small and zoomable.

A stereoscopic optical system according to one aspect of the disclosure includes two optical systems. Each of the two optical systems includes a plurality of lens units and two reflective surfaces disposed on an image side of the plurality of lens units. A distance between adjacent lens units in each of the two optical systems changes during zooming. A distance between optical axes of the two optical systems is narrower on the image side of the two reflective surfaces than on an object side of the two reflective surfaces. The following inequality is satisfied for each of the two optical systems:

$$0.20 \leq (fT \cdot \theta T)/(fW \cdot \theta W) < 1.00$$

where fW is a focal length at a wide-angle end of each of the two optical systems, fT is a focal length at a telephoto end of each of the two optical systems, θW is a maximum angle of view at the wide-angle end of each of the two optical systems, and θT is a maximum angle of view at the telephoto end of each of the two optical systems. An image pickup apparatus including the above stereoscopic optical system also constitutes another aspect of the disclosure.

Further features of the disclosure will become apparent from the following description according to Examples with reference to the attached drawings.

DESCRIPTION OF THE EXAMPLES

Referring now to the accompanying drawings, a description will be given according to examples of the disclosure. A description will now be given of an overview of a stereoscopic optical system according to each example.

Viewers can acquire a high sense of reality by displaying a stereoscopically viewable image on a virtual reality (VR) display apparatus such as a head mount display. A stereoscopic optical system in which two optical systems having the same specifications are disposed in parallel is used to acquire the stereoscopic image through imaging.

A fisheye lens having an angle of view of 180° is often used for each optical system in such a stereoscopic optical system. Then, an image having an angle of view of 180° is displayed on the VR display apparatus, but the angle of view viewable by the viewer with a fixed head state is about 100°. The viewer can recognize an image at the entire angle of view by vertically and horizontally changing his head direction.

In a case where the viewer wishes stereoscopic viewing of a specific object, imaging may be made with an angle of view of 100° or less viewable by the viewer with his head fixed. Thus, a zoom lens may be used whose angle of view is variable from 180° to an angle of 100° or less as each optical system of the stereoscopic optical system. In this case, based on a displaying method of the VR display apparatus and the size of the optical system, an image height may be set variable for each focal length of the optical system.

Assuming that the viewer views, with his head fixed, an image acquired through imaging at the telephoto end, an image height at the telephoto end may be an image height that corresponds to an angle of view that is about half that of an image height corresponding to an angle of view at the wide-angle end. Setting the image height at the telephoto end to be lower than the image height at the wide-angle end can shorten the overall lens length at the telephoto end for a high-magnification zoom lens that tend to have restrictions in an overall lens length at the telephoto end, and can reduce the size of the entire stereoscopic optical system.

The stereoscopic optical system according to each example can provide zooming with a high magnification variation ratio and a small size by setting an image height according to a focal length.

Example 1

Figure 1:
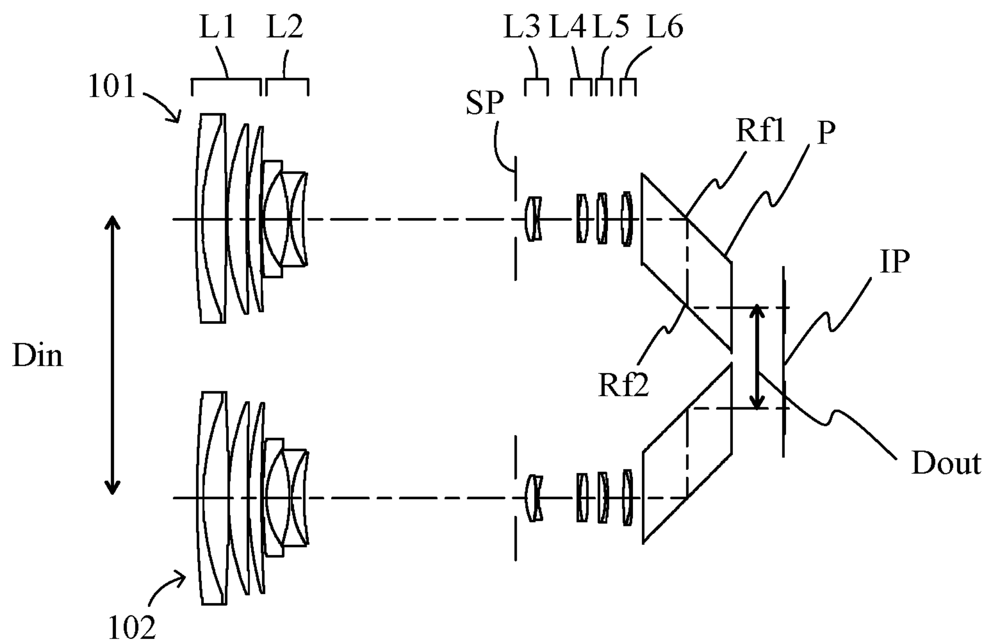
FIG. 1 illustrates an optical configuration at a wide-angle end of a stereoscopic optical system according to Example 1 (numerical example 1).
Figure 2:
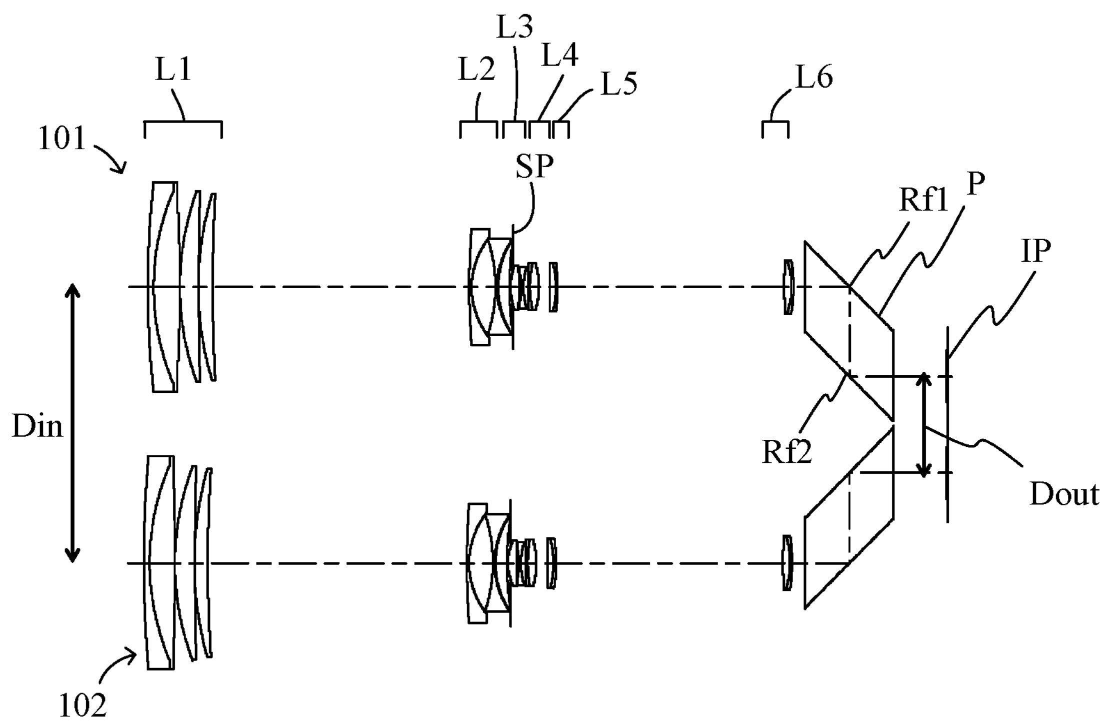
FIG. 2 illustrates an optical configuration at a telephoto end of the stereoscopic optical system according to numerical example 1.

FIGS. 1 and 2 respectively illustrate the configurations at the wide-angle end and the telephoto end of the stereoscopic optical system 100 according to Example 1 viewed from the top, respectively.

A stereoscopic optical system 100 according to this example includes two optical systems 101 and 102 disposed in parallel. The optical systems 101 and 102 have the same configuration except for a light reflecting direction on a reflective surface, which will be described below.

The optical systems 101 and 102 are disposed while they are separated by a distance (basic line length) Din between their optical axes on the object side (left sides in FIGS. 1 and 2) as indicated by alternate long and short dash lines. The optical systems 101 and 102 are disposed while they are separated by a distance Dout between their optical axes on the image side (right sides in FIGS. 1 and 2).

Each optical system (101, 102) includes a plurality of lens units and an aperture stop (diaphragm). More specifically, each optical system includes, in order from the object side to the image side, a first lens unit L1, a second lens unit L2, an aperture stop SP, a third lens unit L3, a fourth lens unit L4, a fifth lens unit L5, and a sixth lens unit L6.

A lens unit is one or a group of a plurality of lenses that move together during magnification variation (zooming) between the wide-angle end and the telephoto end. That is, a distance between adjacent lens units changes during zooming. The lens unit may include an aperture stop. The wide-angle end and telephoto end are zoom states at the maximum angle of view (shortest focal length) and minimum angle of view (maximum focal length) in a case where the lens unit configured to move during zooming is located at both ends of a mechanically or controllably movable range on the optical axis.

Each optical system includes an optical member (prism) P on the image side of the sixth lens unit L6. The optical member P includes, in order from the object side to the image side, a reflective surface Rf1 and a reflective surface Rf2 that reflect light and bend the optical path. The bent optical paths at the reflective surfaces Rf1 and Rf2 can make the distance Dout between the optical axes on the image side of the reflective surfaces Rf1 and Rf2 smaller than the base length Din on the object side of the reflective surfaces Rf1 and Rf2. Thereby, a base length enough to acquire a stereoscopically viewable image can be secured with a small size. The reflective surfaces Rf1 and Rf2 may be provided on separate optical members.

IP denotes an image plane (paraxial imaging position). An image sensor such as a CCD sensor or a CMOS sensor and a film plane (photosensitive plane) of a silver film are disposed on the image plane IP. Two optical images (object images) are formed on the image plane IP by the optical systems 101 and 102. These optical images are captured by a single image sensor or one frame of film.

As illustrated in FIGS. 1 and 2, each optical system provides zooming between the wide-angle end and the telephoto end by moving each of the first lens unit L1 to the sixth lens unit L6 such that distances between adjacent lens units change.

Figure 3:
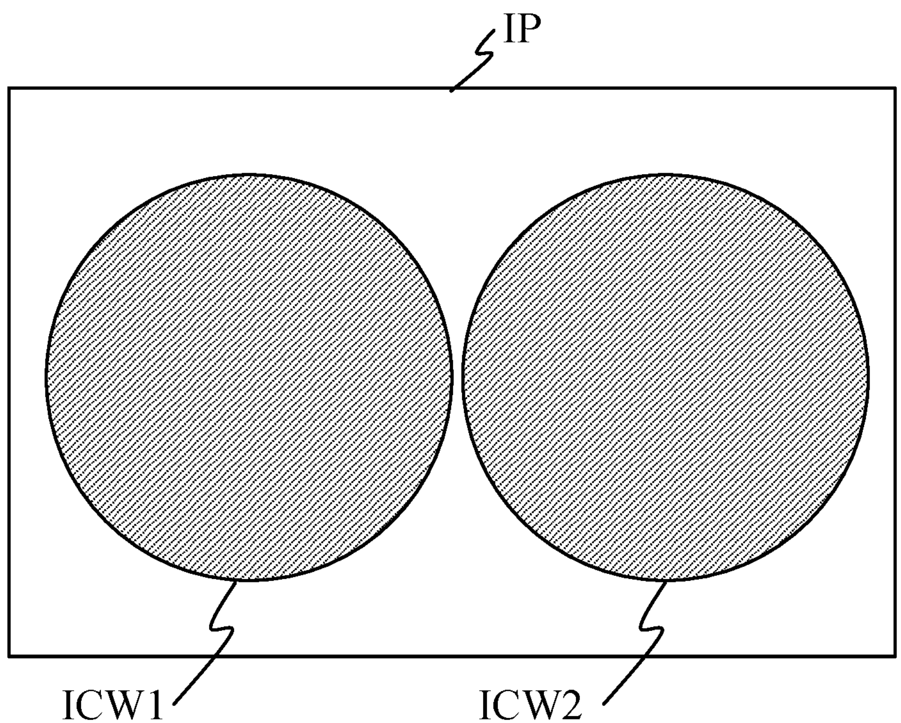
FIG. 3 illustrates an image circle at the wide-angle end in numerical example 1.

FIG. 3 illustrates image circles ICW1 and ICW2 respectively formed on the image plane (imaging plane of the image sensor) IP by the two optical systems 101 and 102 at the wide-angle ends. An image circle is an area in which an optical image that is imageable is formed to obtain a viewable image. The outside of the image circle is an area where an optical image for obtaining a viewable image is not formed due to lack of light or deterioration of optical performance. Each example defines an angle of view corresponding to the image circle at the wide-angle end as the maximum angle of view.

Figure 4:
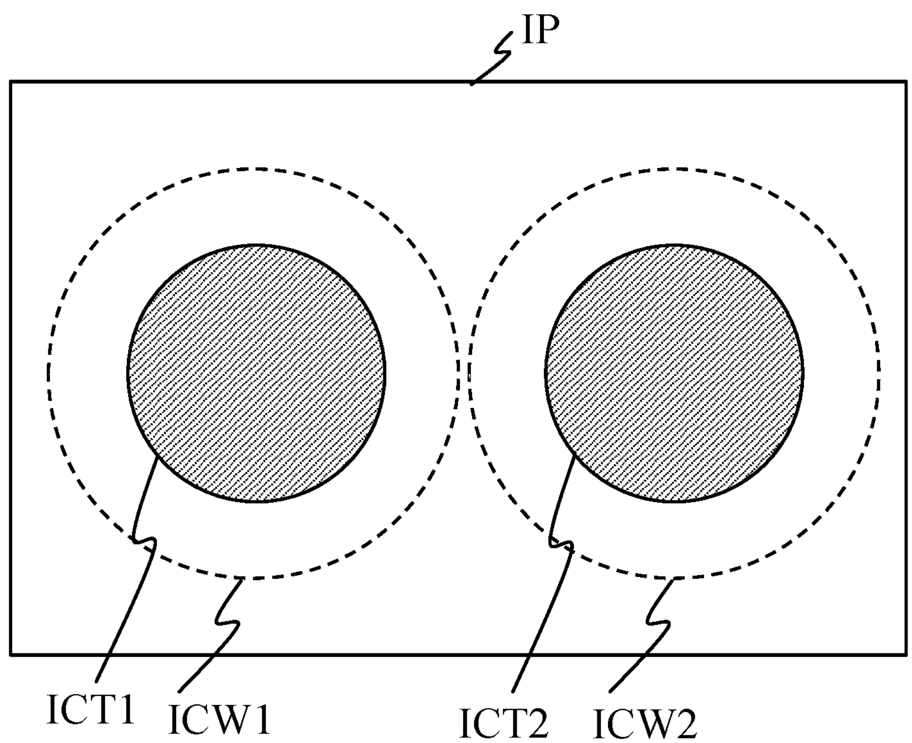
FIG. 4 illustrates an image circle at the telephoto end in numerical example 1.

FIG. 4 illustrates image circles ICT1 and ICT2 respectively formed on the image plane IP by the two optical systems 101 and 102 at the telephoto ends. The image circles ICW1 and ICW2 at the wide-angle ends illustrated in FIG. 3 are indicated by dashed lines. As understood from FIG. 4, in this example, the image circles ICT1 and ICT2 at the telephoto end are set smaller than the image circles at the wide-angle end.

Figure 25:
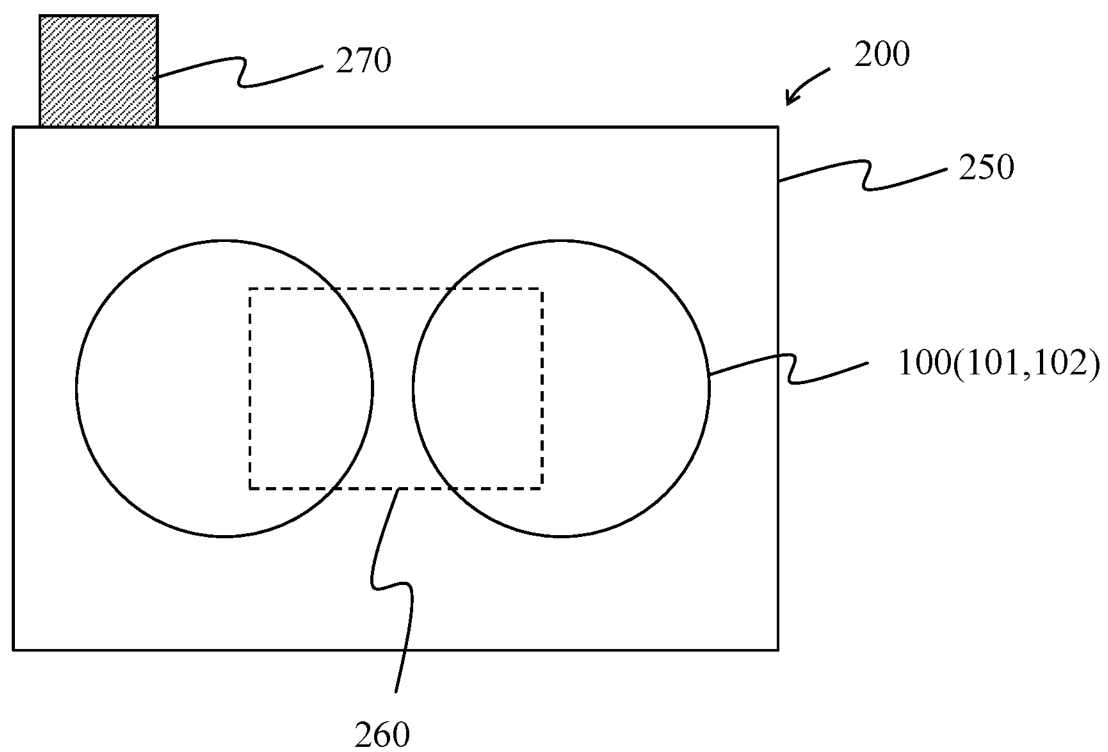
FIG. 25 is a schematic diagram of an image pickup apparatus including the stereoscopic optical system according to any one of Examples 1 to 5.

FIG. 25 illustrates an image pickup apparatus (digital camera) 200 including the stereoscopic optical system 100 according to Example 1. The image pickup apparatus 200 includes the stereoscopic optical system 100 and a camera body 250. The stereoscopic optical system 100 may be integrated with the camera body 250 or attachable to and detachable from the camera body 250.

The camera body 250 includes a single image sensor 260 and an imaging switch 270 operable by the user who instructs imaging. The image circles formed by the two optical systems 101 and 102 of the stereoscopic optical system 100 are located within the imaging plane of the image sensor 260.

The stereoscopic optical system 100 can be used not only for the digital camera illustrated in FIG. 25, but also for various image pickup apparatuses such as broadcast cameras, surveillance cameras, and film-based cameras.

Figure 5:
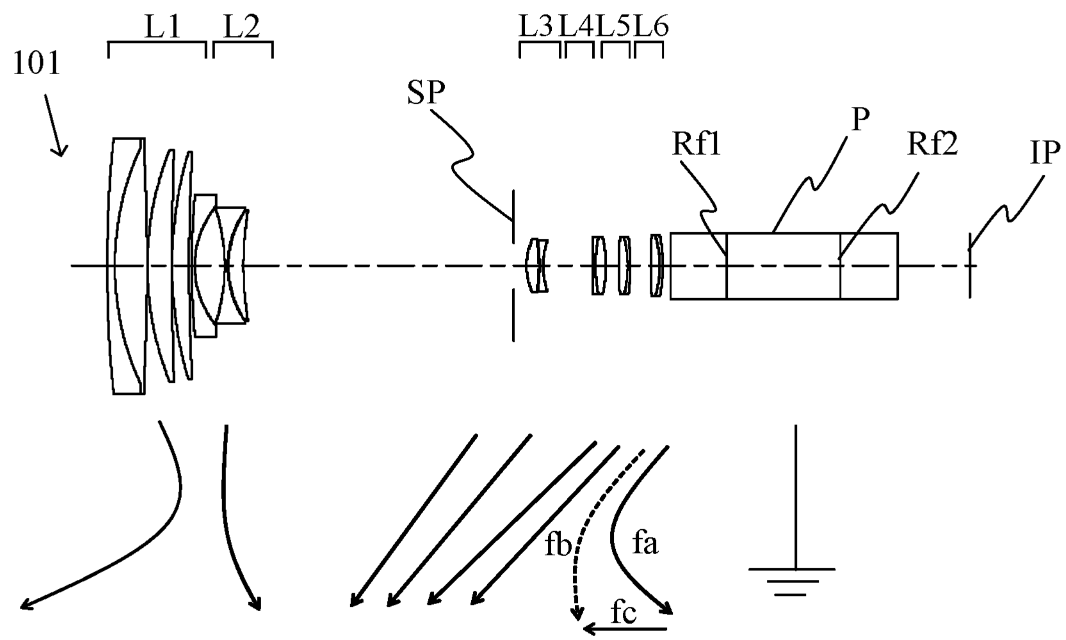
FIG. 5 is a sectional view of one optical system according to numerical example 1.

Referring now to FIG. 5, a detailed description will be given of the optical system 101 according to Example 1. A description will be omitted of the optical system 102 having the same configuration as that of the optical system 101 except for the light reflecting directions on the reflective surfaces Rf1 and Rf2. This is similarly applied to Examples 2 to 5 described below.

The optical system 101 includes, in order from the object side to the image side, a first lens unit L1 having positive refractive power, a second lens unit L2 having negative refractive power, an aperture stop SP, a third lens unit L3 having positive refractive power, and a fourth lens unit L4 having positive refractive power, a fifth lens unit L5 having positive refractive power, and a sixth lens unit L6 having positive refractive power. The refractive power (optical power) is a reciprocal of focal length. FIG. 5 illustrates, below each lens unit and the aperture stop SP, their moving loci during zooming from the wide-angle end to the telephoto end. A solid curve fa and a dashed curve fb respectively indicate moving loci of the sixth lens unit L6 during zooming in in-focus states on an infinity object and a short distance object.

During zooming from the wide-angle end to the telephoto end, the first lens unit L1 moves to the image side and then moves to the object side, and the second lens unit L2 moves to the image side. The third lens unit L3, the fourth lens unit L4, and the fifth lens unit L5 move to the object side on different moving loci. The sixth lens unit L6 moves to the object side and then moves to the image side. Thereby, a distance between the first lens unit L1 and the second lens unit L2 narrows and then widens, and a distance between the second lens unit L2 and the third lens unit L3 narrows. A distance between the third lens unit L3 and the fourth lens unit L4 narrows, a distance between the fourth lens unit L4 and the fifth lens unit L5 widens, and a distance between the fifth lens unit L5 and the sixth lens unit L6 widens. During zooming from the wide-angle end to the telephoto end, the first lens unit L1, the third lens unit L3, the fourth lens unit L4, and the fifth lens unit L5 move toward the object side, and the second lens unit L2 moves toward the image side. Thereby, the overall lens length is reduced at the wide-angle end.

In this example, as illustrated in numerical example 1 described below, the maximum image height at the telephoto end is set lower than the maximum image height at the wide-angle end. Optimizing optical performance over the entire zoom range while the maximum image height is maintained at the wide-angle end increases the overall lens length at the telephoto end in proportion to the image height. However, setting the image height at the telephoto end lower than that at the wide-angle end can shorten the overall lens length at the telephoto end. Setting the maximum image height at the telephoto end to be low can reduce the moving amount of the first lens unit L1 during zooming, and the size of the stereoscopic optical system.

A description will now be given of the aperture stop SP and each lens unit.

(a) The aperture stop SP is disposed between the second lens unit L2 and the third lens unit L3. The diameter of the first lens unit L1 is reduced by moving the aperture stop SP along a moving locus different from that of each lens unit during zooming because a distance is narrowed between the surface closest to the object of the first lens unit L1 and the aperture stop SP at the wide-angle end.

(b) The first lens unit L1 mainly moves to the object side during zooming from the wide-angle end to the telephoto end. Thereby, a large magnification variation ratio can be obtained while the overall lens length at the wide-angle end is reduced. The diameter of the surface closest to the object of the first lens unit L1 is determined by an off-axis ray on the wide-angle side. As the wide-angle scheme proceeds, the diameter becomes larger and it becomes difficult to reduce the size of the first lens unit L1. Therefore, the diameter of the first lens unit L1 is reduced by reducing the overall lens length at the wide-angle end to bring the first lens unit L1 closer to the aperture stop SP, and by moving the first lens unit L1 toward the object side during zooming to secure the zoom magnification at the telephoto end.

(c) The first lens unit L1 includes, in order from the object side to the image side, a total of four lenses, a cemented lens of a negative lens and a positive lens, a positive lens, and a positive lens. Thereby, spherical aberration can be corrected at the super-focal length as the telephoto end while chromatic aberration is corrected.

(d) The second lens unit L2 is located closer to the image plane at the telephoto end than at the wide-angle end. Thereby, a distance between the first lens unit L1 and the second lens unit L2 is widened to obtain a magnification varying effect.

(e) The third lens unit L3 is located closer to the object at the telephoto end than at the wide-angle end. Thereby, a distance between the second lens unit L2 and the third lens unit L3 is narrowed to suppress fluctuations in curvature of field during zooming.

(f) The fourth lens unit L4 is located closer to the object at the telephoto end than at the wide-angle end. Thereby, a distance between the third lens unit L3 and the fourth lens unit L4 is narrowed to increase the magnification varying effect and to suppress fluctuations in curvature of field.

The items (a) and (c) to (f) of the aperture stop SP and the first lens unit L1 to the fourth lens unit L4 are similarly applicable to Examples 2 to 5 described below. The item (b) is similarly applicable to Examples 2 to 4.

In this example, the following items are applied.

(g) The fifth lens unit L5 is located closer to the object at the telephoto end than at the wide-angle end. Thereby, a distance between the fourth lens unit L4 and the fifth lens unit L5 is widened to suppress fluctuations in curvature of field during zooming.

(h) Fluctuations in curvature of field during zooming are suppressed by moving the sixth lens unit L6 along a locus convex toward the object side during zooming.

(i) The sixth lens unit L6 moves along the moving locus indicated by the solid curve fa or broken curve fb during zooming, as described above. Thereby, the movement of the image plane during zooming can be corrected (compensated for). During focusing from the infinity object to the short distance object at the telephoto end, the sixth lens unit L6 moves toward the object side as indicated by arrow fc. Since the sixth lens unit L6 moves toward the object during focusing, a space is provided between the fifth lens unit L5 and the sixth lens unit L6 to avoid their interference during focusing.

The items (g) to (i) for the fifth lens unit L5 and the sixth lens unit L6 are similarly applicable to Examples 3 to 5 described below.

In a case where the stereoscopic optical system 100 is retracted into the camera body 250 while the image pickup apparatus 200 is powered off as illustrated in FIG. 5, the overall lens length can be reduced by reducing a distance between the second lens unit L2 and the third lens unit L3. This is similarly applicable to Examples 2 to 5 described below.

The optical system 101 includes an optical member P on the image side of the lens unit closest to the image plane (the sixth lens unit L6 in this embodiment), in order to secure a base length between the optical systems 101 and 102 and form two optical images side by side on a single image sensor. The optical member P has the two reflective surfaces Rf1 and Rf2.

(j) The degree of freedom of the lens unit movable during zooming can be secured by disposing the reflective surfaces Rf1 and Rf2 on the image side of the lens unit closest to the image plane. That is, all lens units can be moved during zooming. As a result, the overall lens length can be reduced.

(k) Disposing the reflective surfaces Rf1 and Rf2 on the image side of the lens unit closest to the image plane can reduce the diameters of the reflective surfaces Rf1 and Rf2 and the size of the optical member P.

(l) In order to reduce the size of the optical member P, it is necessary to weaken the refractive power of the third lens unit L3 for the following reasons. In a case where the refractive power of the third lens unit L3 is strong, an off-axis ray is significantly bent by the third lens unit L3, and the lens diameter on the image side of the third lens unit L3 becomes large. In order to introduce the light to the inside of the prism, it is necessary to increase the refractive powers of the lens units after the third lens unit L3, but it is difficult to reduce the aperture diameter for the incident light to the optical member P even if the refractive powers are increased. As a result, the optical member P becomes large. Thus, the refractive power of the third lens unit L3 is set to be weak.

(m) The lens units can be efficiently arranged because the optical member P has a shape such that the reflective surfaces Rf1 and Rf2, which are tilted relative to the optical axis of the optical system 101 inside the optical member P by an angle of 45°, can reflect light twice. The optical member P may have a higher refractive index in order to secure a long optical path length.

(n) The length of the optical member P is properly set in order to prevent the first lens units L1, which are the largest lens units in the respective optical systems 101 and 102, from interfering with each other due to structural constraints of arranging the two optical systems 101 and 102 having the same configuration in parallel. More specifically, the length of the optical member P is properly set according to the lateral size of the image sensor, the diameter of the first lens unit L1, and the refractive index of the optical member P.

The items (j) to (n) regarding the optical member P are similarly applicable to Examples 2 to 5 described below.

A description will be given of numerical example 1 corresponding to Example 1. FIG. 5 for the above description illustrates the optical configuration of the optical system 101 according to numerical example 1 at the wide-angle end.

The optical system 101 according to numerical example 1 is a zoom lens having a magnification variation ratio of 35.71 (times) and an aperture ratio of about 4.00 to 7.00. In numerical example 1, the maximum image height at the wide-angle end is set to 6.14 mm, and the maximum image height at the telephoto end is set to 3.88 mm.

Figure 6:
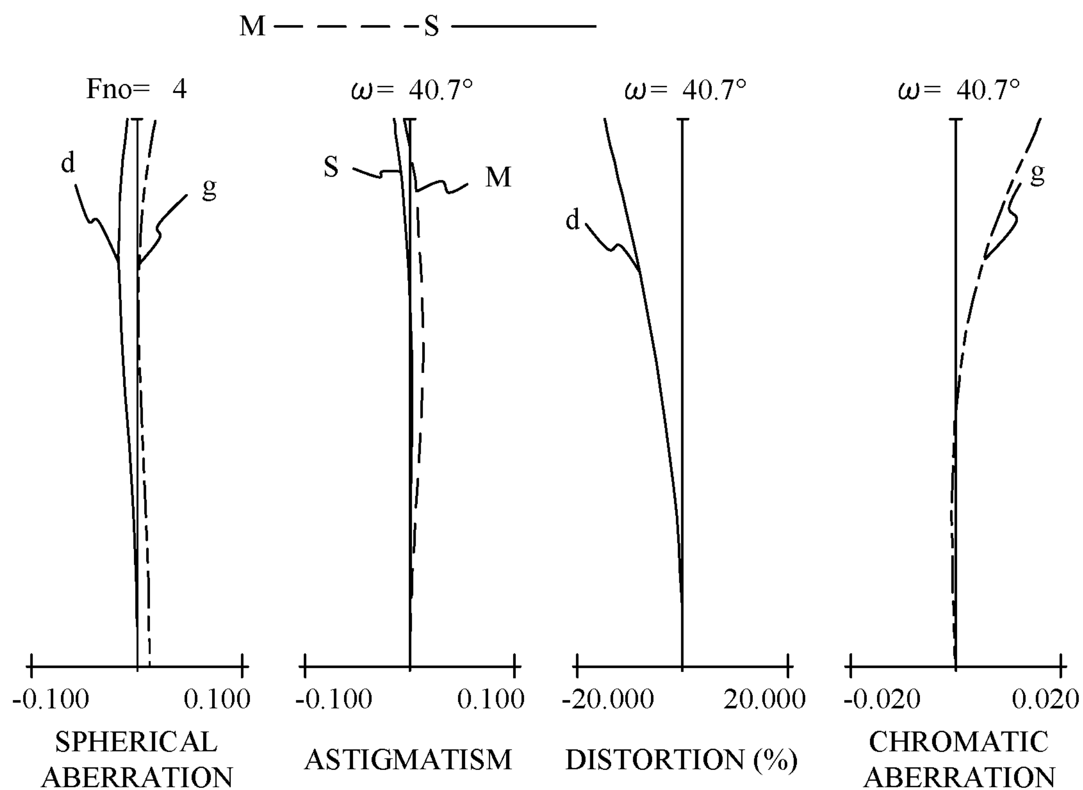
FIG. 6 is an aberration diagram at the wide-angle end in numerical example 1.
Figure 7:
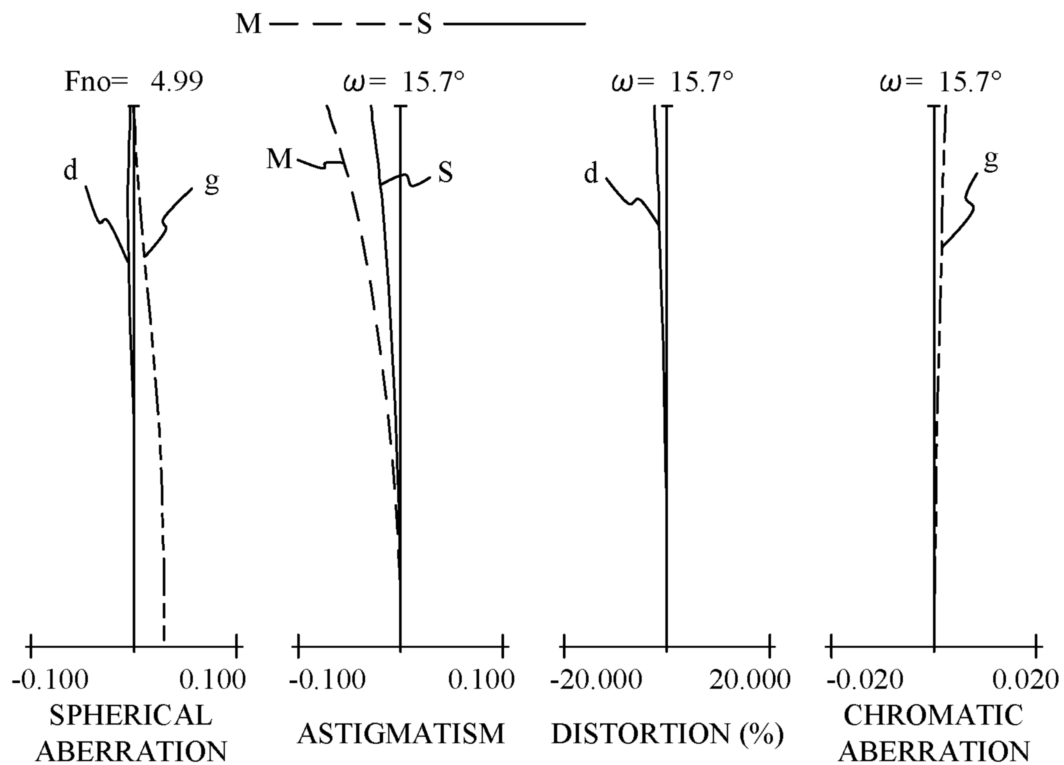
FIG. 7 is an aberration diagram at an intermediate zoom position in numerical example 1.
Figure 8:
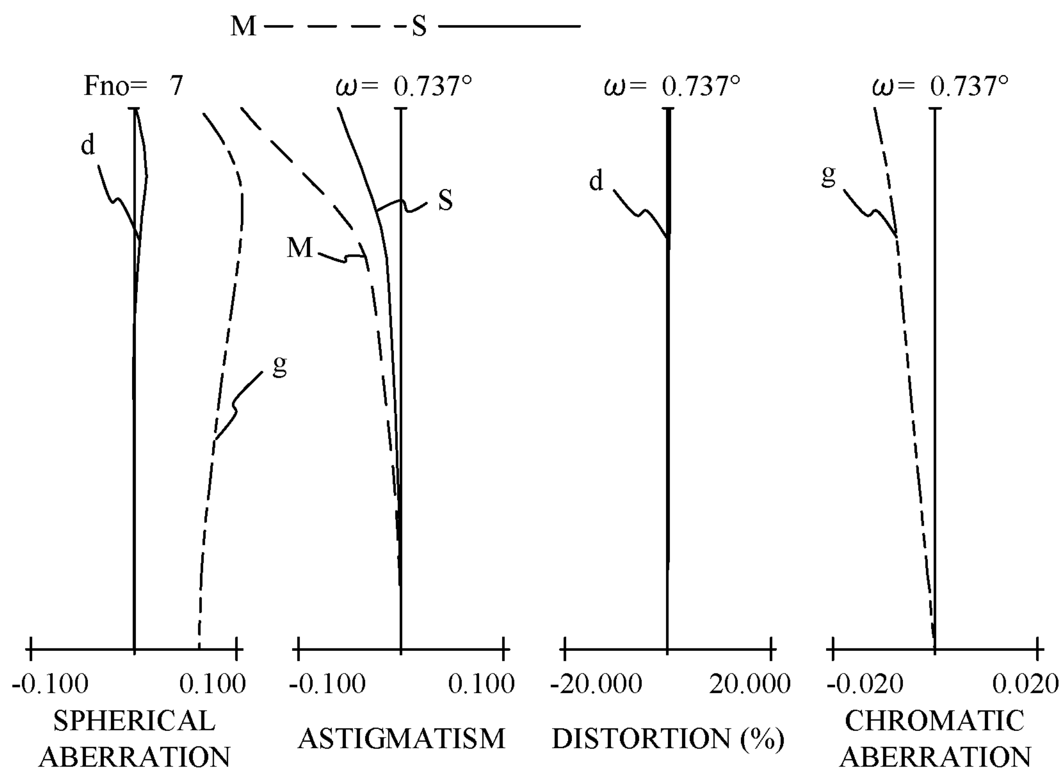
FIG. 8 is an aberration diagram at the telephoto end in numerical example 1.

FIGS. 6, 7 and 8 illustrate longitudinal aberrations (spherical aberration, astigmatism, distortion, and chromatic aberration) at the wide-angle end, intermediate zoom position, and telephoto end of the optical system 101 according to numerical example 1, respectively. In the spherical aberration diagram, Fno indicates an F-number, a solid line indicates a spherical aberration amount for the d-line (wavelength 587.6 nm), and an alternate long and two short dashes line indicates a spherical aberration amount for the g-line (wavelength 435.8 nm). In the astigmatism diagram, a solid line S indicates an astigmatism amount on a sagittal image plane, and a dashed line M indicates an astigmatism amount on a meridional image plane. The distortion diagram illustrates a distortion amount for the d-line. The chromatic aberration diagram illustrates a lateral chromatic aberration amount for the g-line. ω is a half angle of view (°). The description of these aberration diagrams is similarly applicable to other numerical examples.

In this example (and other examples described below), no lens unit is disposed between the reflective surfaces Rf1 and Rf2 or between the reflective surface Rf2 and the image plane IP. However, a lens unit may be disposed between them.

Example 2

Figure 9:
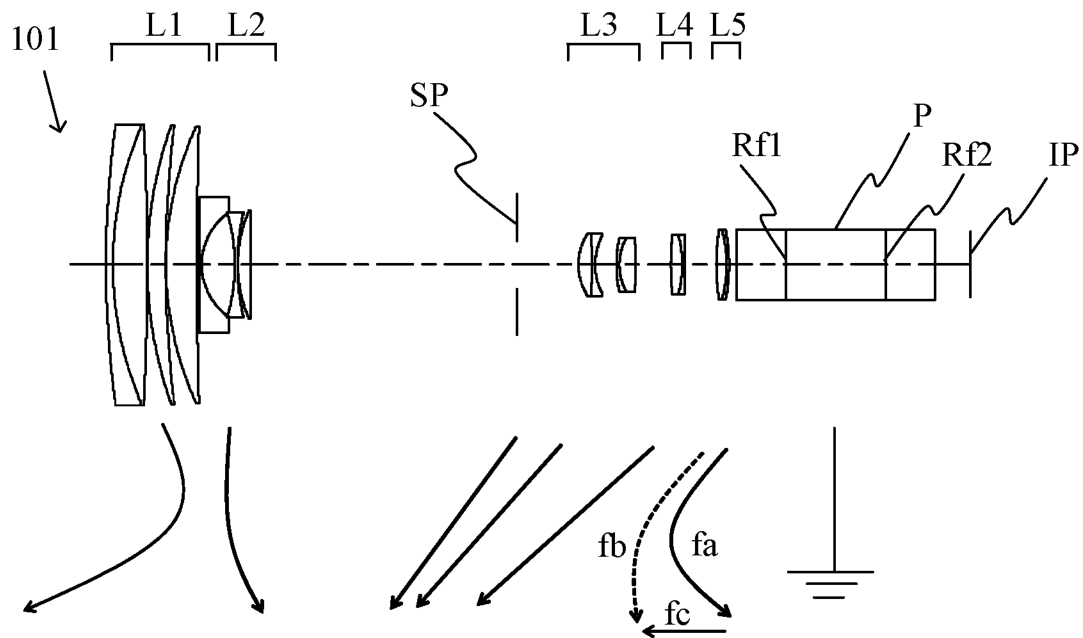
FIG. 9 is a sectional view of one optical system according to Example 2 (numerical example 2).

FIG. 9 illustrates an optical configuration of the optical system 101 according to Example 2 at the wide-angle end. The optical system 101 includes, in order from the object side to the image side, a first lens unit L1 having positive refractive power, a second lens unit L2 having negative refractive power, an aperture stop SP, a third lens unit L3 having positive refractive power, a fourth lens unit L4 having negative refractive power, and a fifth lens unit L5 having positive refractive power. FIG. 9 illustrates, below each lens unit and the aperture stop SP, their moving loci during zooming from the wide-angle end to the telephoto end. A solid curve fa and a dashed curve fb respectively indicate moving loci of the fifth lens unit L5 during zooming in in-focus states on an infinity object and a short distance object.

During zooming from the wide-angle end to the telephoto end, the first lens unit L1 moves toward the image side and then toward the object side, and the second lens unit L2 moves toward the image side. The third lens unit L3 and the fourth lens unit L4 move toward the object along different moving loci. The fifth lens unit L5 moves toward the object side and then moves toward the image side. Thereby, the distance between the first lens unit L1 and the second lens unit L2 narrows and then widens, and the distance between the second lens unit L2 and the third lens unit L3 narrows. The distance between the third lens unit L3 and the fourth lens unit L4 narrows, and the distance between the fourth lens unit L4 and the fifth lens unit L5 widens. During zooming from the wide-angle end to the telephoto end, the first lens unit L1, the third lens unit L3, and the fourth lens unit L4 move toward the object side, and the second lens unit L2 moves toward the image side. Thereby, the overall lens length is reduced at the wide-angle end.

Even in this example, as illustrated in numerical example 2 described below, the maximum image height at the telephoto end is set lower than the maximum image height at the wide-angle end. Thereby, the overall lens length is reduced at the telephoto end. Setting the maximum image height at the telephoto end to be low can reduce the moving amount of the first lens unit L1 during zooming and the size of the stereoscopic optical system.

This example suppresses fluctuations in curvature of field during zooming by moving the fifth lens unit L5 along a locus convex toward the object side during zooming.

The fifth lens unit L5 moves along the moving locus indicated by the solid curve fa or broken curve fb during zooming, as described above. Thereby, the movement of the image plane during zooming can be corrected (compensated for). During focusing from the infinity object to the short distance object at the telephoto end, the fifth lens unit L5 moves toward the object side as indicated by arrow fc. Since the fifth lens unit L5 moves toward the object during focusing, a space is provided between the fourth lens unit L4 and the fifth lens unit L5 to avoid their interference during focusing.

A description will now be given of numerical example 2 corresponding to Example 2. FIG. 9 illustrates the optical configuration of the optical system 101 according to numerical example 2 at the wide-angle end.

The optical system 101 according to numerical example 2 is a zoom lens having a magnification variation ratio of 54.76 (times) and an aperture ratio of about 4.00 to 8.00. In numerical example 2, the maximum image height at the wide-angle end is set to 7.00 mm, and the maximum image height at the telephoto end is set to 3.88 mm.

Figure 10:
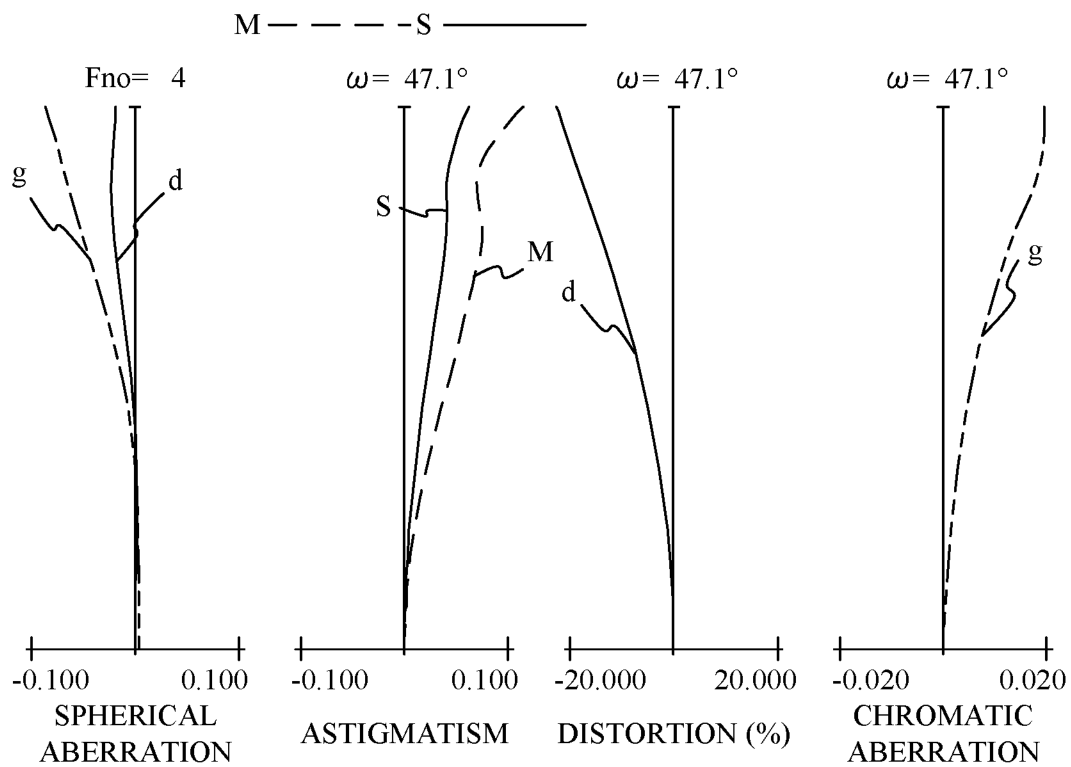
FIG. 10 is an aberration diagram at a wide-angle end in numerical example 2.
Figure 11:
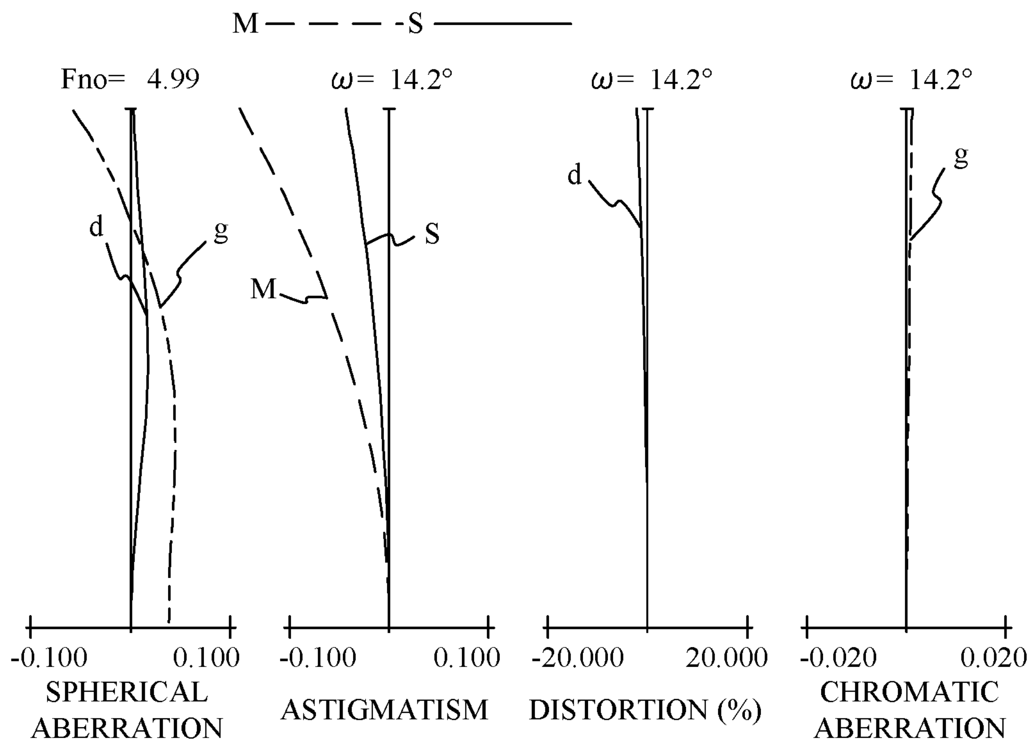
FIG. 11 is an aberration diagram at an intermediate zoom position in numerical example 2.
Figure 12:
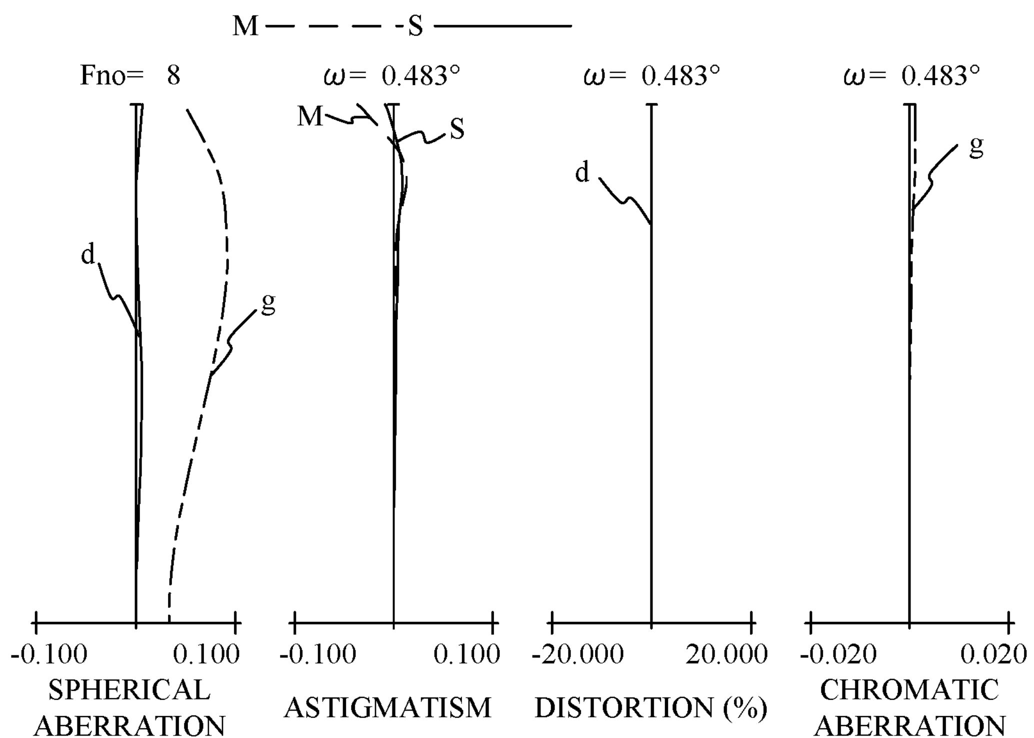
FIG. 12 is an aberration diagram at a telephoto end in numerical example 2.

FIGS. 10, 11, and 12 illustrate longitudinal aberrations (spherical aberration, astigmatism, distortion, and chromatic aberration) at the wide-angle end, intermediate zoom position, and telephoto end of the optical system 101 according to numerical example 2, respectively.

Example 3

Figure 13:
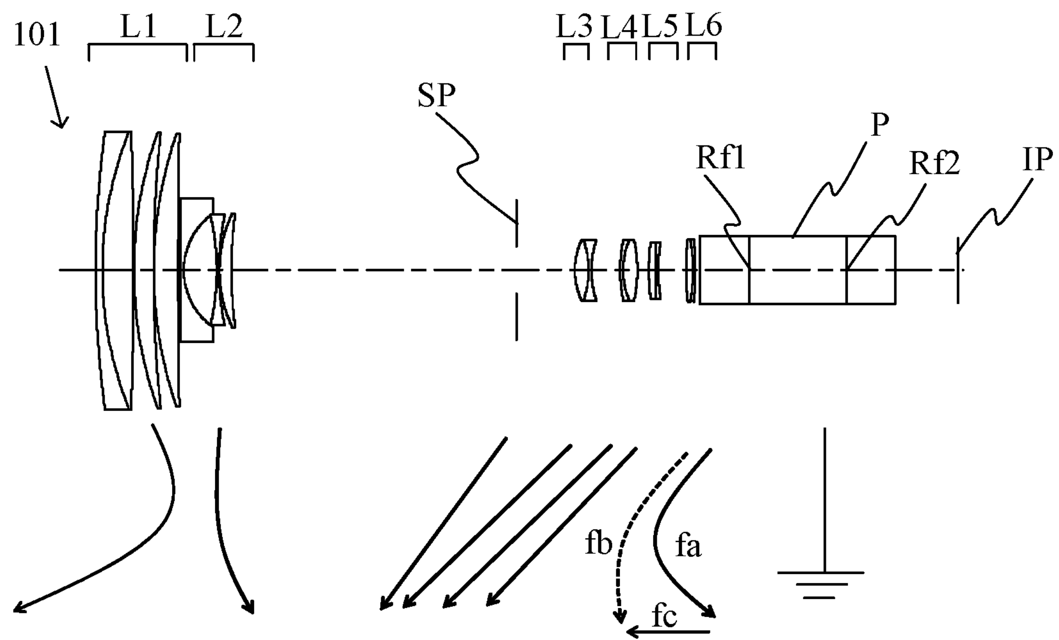
FIG. 13 is a sectional view of one optical system according to Example 3 (numerical example 3).

FIG. 13 illustrates the optical configuration of the optical system 101 according to Example 3 at the wide-angle end. The optical system 101 includes, in order from the object side to the image side, a first lens unit L1 having positive refractive power, a second lens unit L2 having negative refractive power, an aperture stop SP, a third lens unit L3 having positive refractive power, a fourth lens unit L4 having positive refractive power, a fifth lens unit L5 having negative refractive power, and a sixth lens unit L6 having positive refractive power. FIG. 13 illustrates, below each lens unit and the aperture stop SP, their movement loci during zooming from the wide-angle end to the telephoto end. A solid curve fa and a dashed curve fb respectively indicate the moving loci of the sixth lens unit L6 during zooming in in-focus states on an infinity object and a short distance object.

During zooming from the wide-angle end to the telephoto end, the first lens unit L1 moves toward the image side and then toward the object side, and the second lens unit L2 moves toward the image side. The third lens unit L3, the fourth lens unit L4, and the fifth lens unit L5 move toward the object side on different moving loci. The sixth lens unit L6 moves to the object side and then moves to the image side. Thereby, the distance between the first lens unit L1 and the second lens unit L2 narrows and then widens, and the distance between the second lens unit L2 and the third lens unit L3 narrows. The distance between the third lens unit L3 and the fourth lens unit L4 narrows, the distance between the fourth lens unit L4 and the fifth lens unit L5 widens, and the distance between the fifth lens unit L5 and the sixth lens unit L6 widens. During zooming from the wide-angle end to the telephoto end, the first lens unit L1, the third lens unit L3, the fourth lens unit L4, and the fifth lens unit L5 move toward the object side, and the second lens unit L2 moves toward the image side. Thereby, the overall lens length is reduced at the wide-angle end.

Even in this example, as illustrated in numerical example 3, which will be described below, the maximum image height at the telephoto end is set lower than the maximum image height at the wide-angle end. Thereby, the overall lens length is reduced at the telephoto end. Setting the maximum image height at the telephoto end to be low can reduce the moving amount of the first lens unit L1 during zooming and the size of the stereoscopic optical system.

A description will now be given of numerical example 3 corresponding to Example 3. FIG. 13 illustrates the optical configuration of the optical system 101 according to numerical example 3 at the wide-angle end.

The optical system 101 according to numerical example 3 is a zoom lens having a magnification variation ratio of 54.76 (times) and an aperture ratio of about 4.00 to 8.00. In numerical example 3, the maximum image height at the wide-angle end is set to 7.00 mm, and the maximum image height at the telephoto end is set to 3.88 mm.

Figure 14:
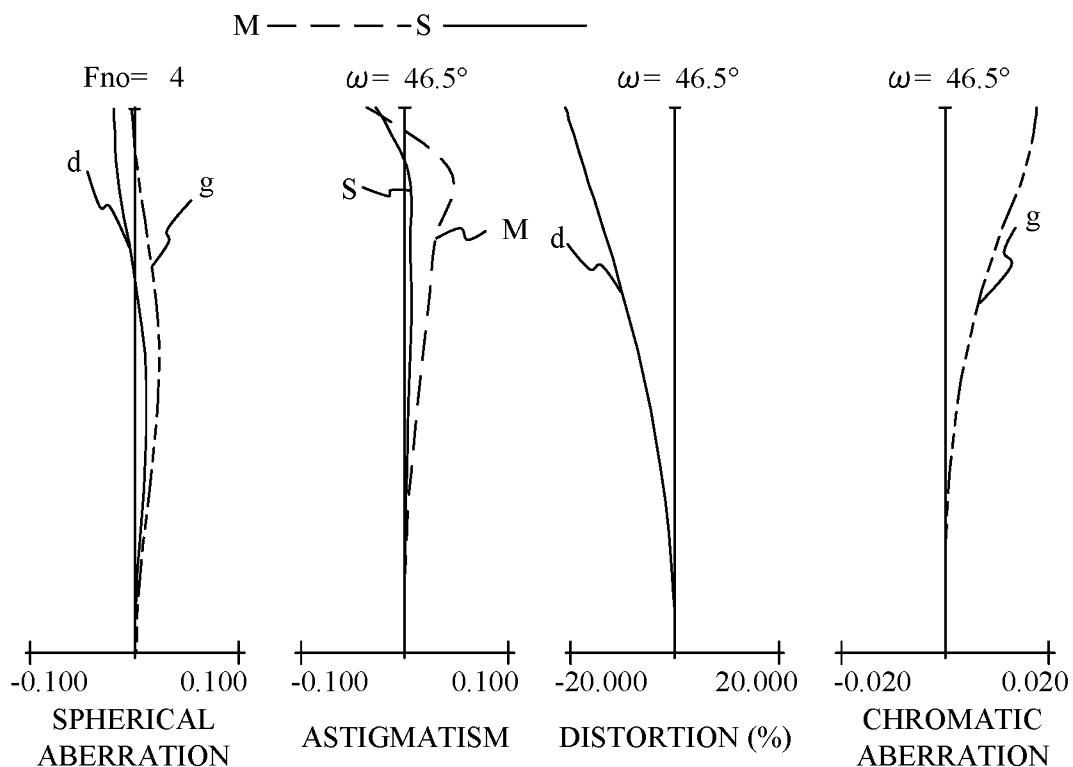
FIG. 14 is an aberration diagram at a wide-angle end in numerical example 3.
Figure 15:
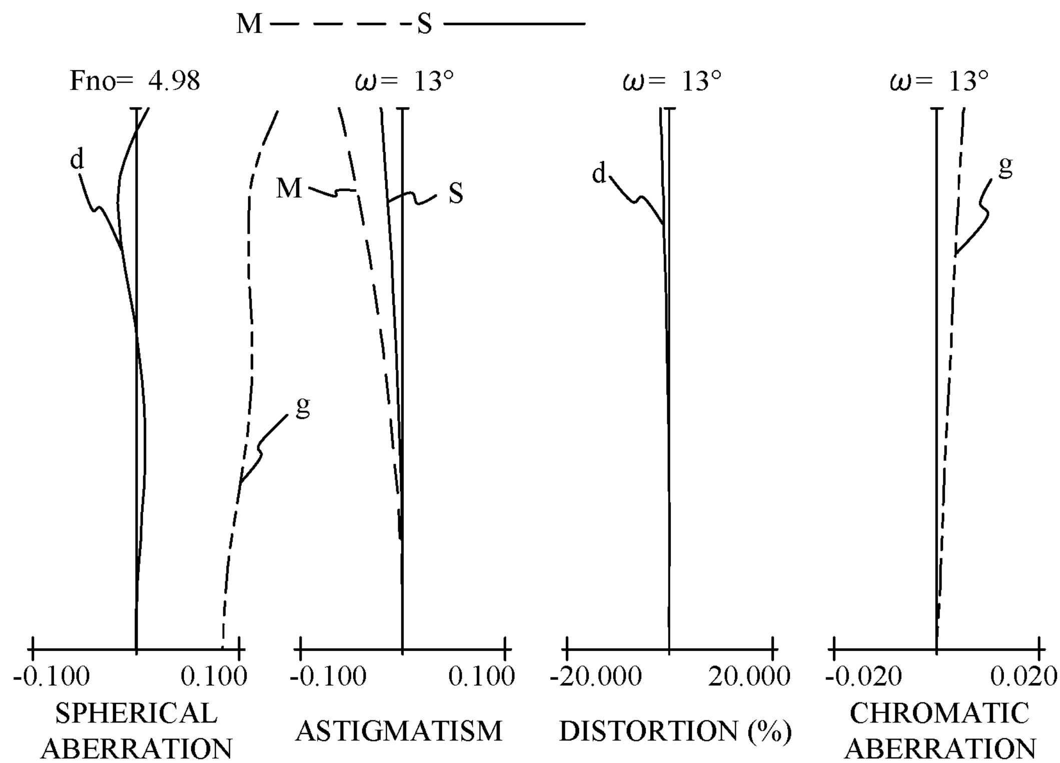
FIG. 15 is an aberration diagram at an intermediate zoom position in numerical example 3.
Figure 16:
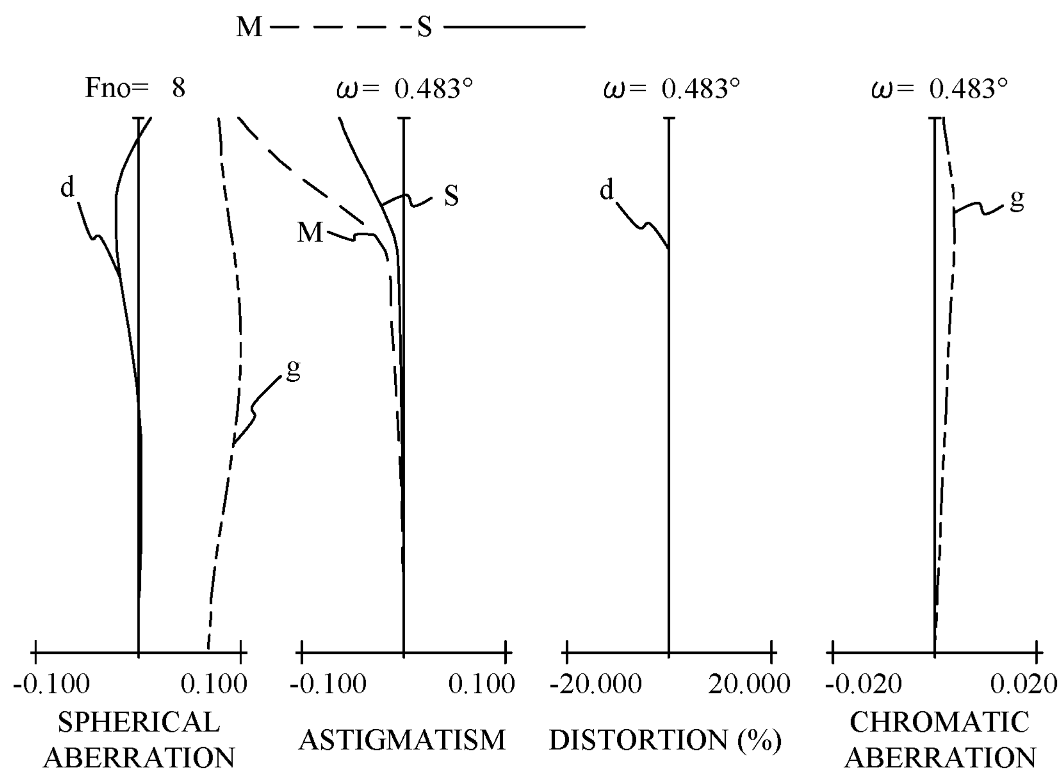
FIG. 16 is an aberration diagram at a telephoto end in numerical example 3.

FIGS. 14, 15, and 16 illustrate longitudinal aberrations (spherical aberration, astigmatism, distortion, and chromatic aberration) at the wide-angle end, intermediate zoom position, and telephoto end of the optical system 101 according to numerical example 3, respectively.

Example 4

Figure 17:
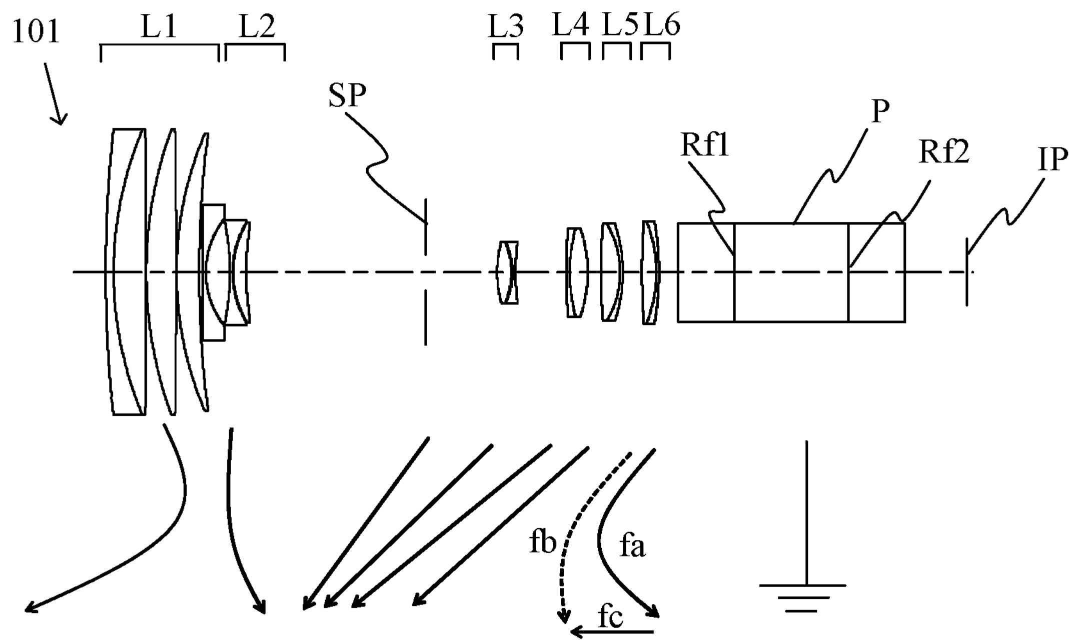
FIG. 17 is a sectional view of one optical system according to Example 4 (numerical example 4).

FIG. 17 illustrates the optical configuration of the optical system 101 according to Example 4 at the wide-angle end. The optical system 101 includes, in order from the object side to the image side, a first lens unit L1 having positive refractive power, a second lens unit L2 having negative refractive power, an aperture stop SP, a third lens unit L3 having negative and positive refractive power, a fourth lens unit L4 having positive refractive power, a fifth lens unit L5 having positive refractive power, and a sixth lens unit L6 having positive refractive power. FIG. 17 illustrates, below each lens unit and the aperture stop SP, their movement loci during zooming from the wide-angle end to the telephoto end. A solid curve fa and a dashed curve fb respectively indicate the moving loci of the sixth lens unit L6 during zooming in in-focus states on an infinity object and a short distance object.

During zooming from the wide-angle end to the telephoto end, the first lens unit L1 moves toward the image side and then toward the object side, and the second lens unit L2 moves toward the image side. The third lens unit L3, the fourth lens unit L4, and the fifth lens unit L5 move toward the object side on different moving loci. The sixth lens unit L6 moves to the object side and then moves to the image side. Thereby, the distance between the first lens unit L1 and the second lens unit L2 narrows and then widens, and the distance between the second lens unit L2 and the third lens unit L3 narrows. The distance between the third lens unit L3 and the fourth lens unit L4 narrows, the distance between the fourth lens unit L4 and the fifth lens unit L5 widens, and the distance between the fifth lens unit L5 and the sixth lens unit L6 widens. During zooming from the wide-angle end to the telephoto end, the first lens unit L1, the third lens unit L3, the fourth lens unit L4, and the fifth lens unit L5 move toward the object side, and the second lens unit L2 moves toward the image side. Thereby, the overall lens length is reduced at the wide-angle end.

In this example, as illustrated in numerical example 4, which will be described below, the maximum image height at the telephoto end is set lower than the maximum image height at the wide-angle end. Thereby, the overall lens length at the telephoto end is reduced. Setting the maximum image height at the telephoto end low can reduce the moving amount of the first lens unit L1 during zooming and the size of the stereoscopic optical system.

A description will now be given of numerical example 4 corresponding to Example 4. FIG. 17 illustrates the optical configuration of the optical system 101 according to numerical example 4 at the wide-angle end.

The optical system 101 according to numerical example 4 is a zoom lens having a magnification variation ratio of 33.33 (times) and an aperture ratio of about 4.00 to 5.00. In numerical example 4, the maximum image height at the wide-angle end is set to 6.14 mm, and the maximum image height at the telephoto end is set to 3.88 mm.

Figure 18:
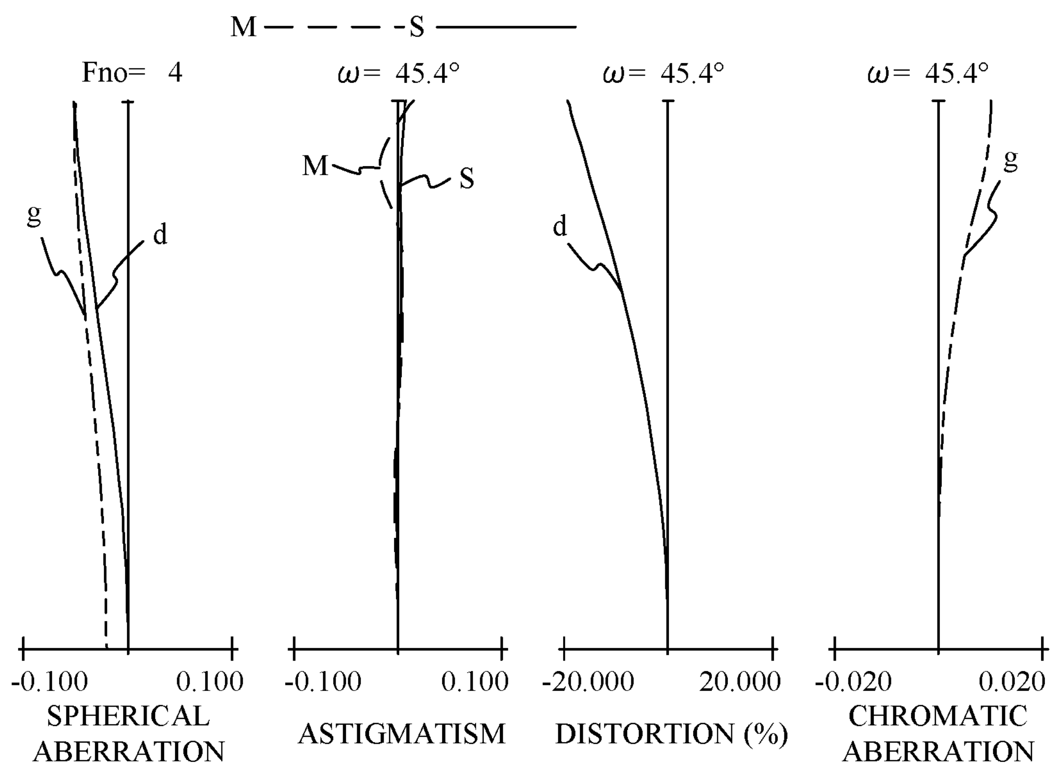
FIG. 18 is an aberration diagram at a wide-angle end in numerical example 4.
Figure 19:
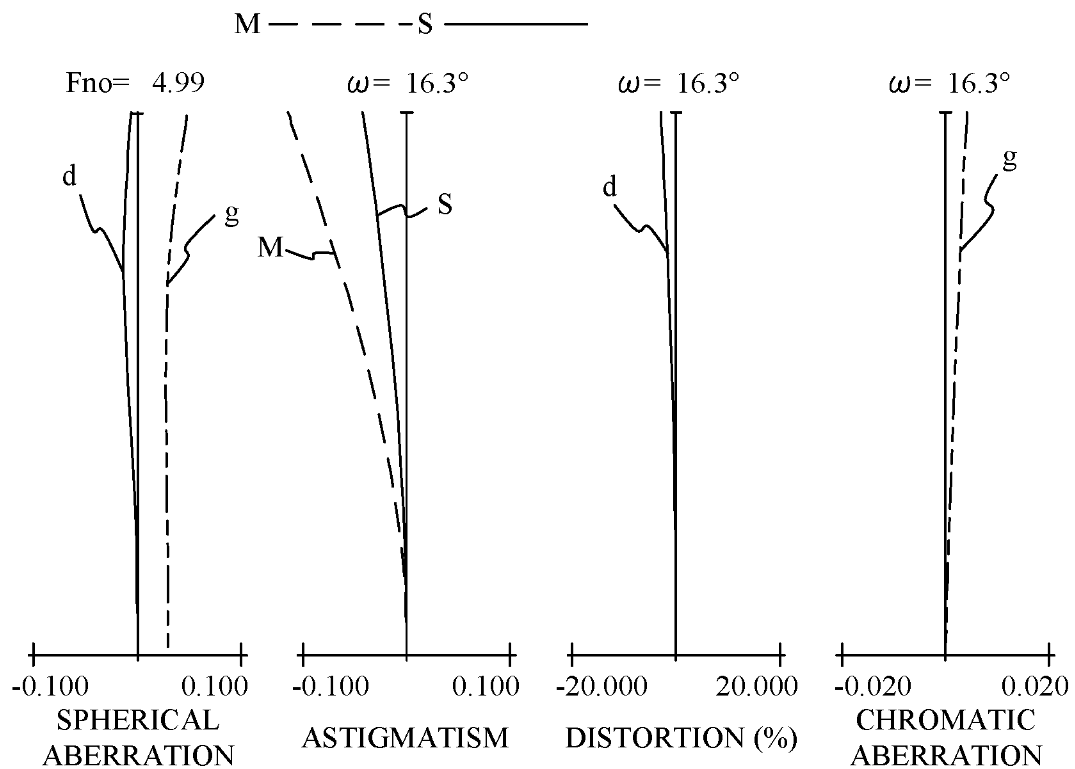
FIG. 19 is an aberration diagram at an intermediate zoom position in numerical example 4.
Figure 20:
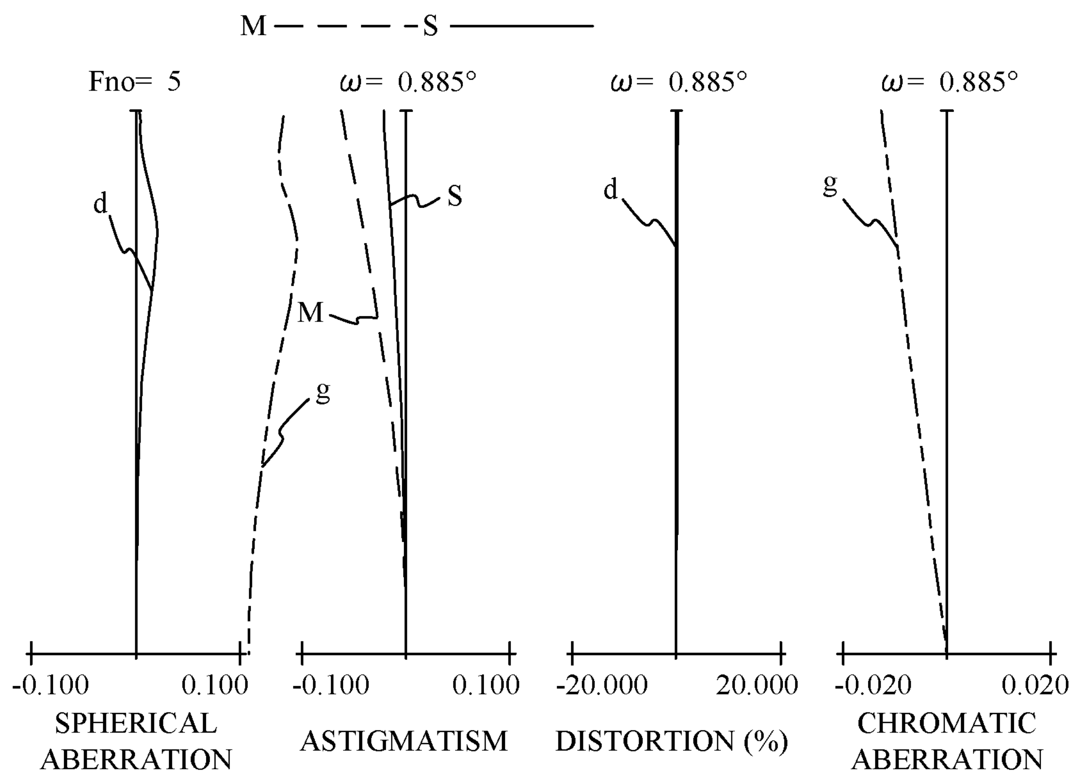
FIG. 20 is an aberration diagram at a telephoto end in numerical example 4.

FIGS. 18, 19, and 20 illustrate longitudinal aberrations (spherical aberration, astigmatism, distortion, and chromatic aberration) at the wide-angle end, intermediate zoom position, and telephoto end of the optical system 101 according to numerical example 4, respectively.

Example 5

Figure 21:
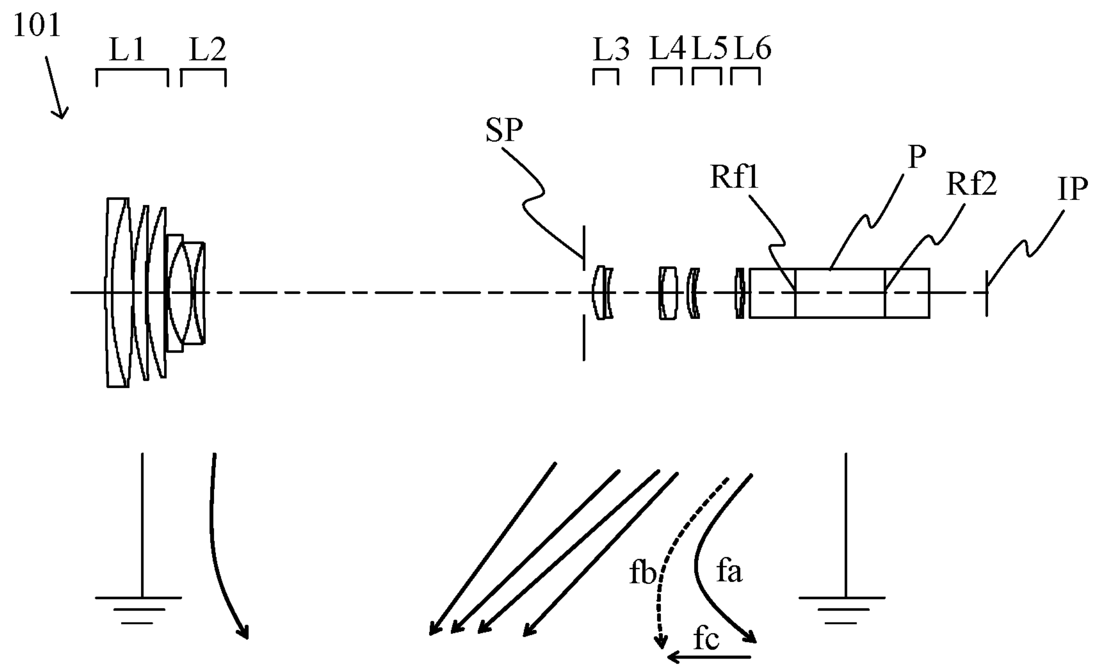
FIG. 21 is a sectional view of one optical system according to Example 5 (numerical example 5).

FIG. 21 illustrates the optical configuration of the optical system 101 according to Example 5 at the wide-angle end. The optical system 101 includes, in order from the object side to the image side, a first lens unit L1 having positive refractive power, a second lens unit L2 having negative refractive power, an aperture stop SP, a third lens unit L3 having positive refractive power, a fourth lens unit L4 having positive refractive power, a fifth lens unit L5 having negative refractive power, and a sixth lens unit L6 having positive refractive power. FIG. 17 illustrates, below the second lens unit L2 to the sixth lens unit L6 and the aperture stop SP, their movement loci during zooming from the wide-angle end to the telephoto end. A solid curve fa and a dashed curve fb respectively indicate the moving loci of the sixth lens unit L6 during zooming in in-focus states on an infinity object and a short distance object.

During zooming from the wide-angle end to the telephoto end, the first lens unit L1 is stationary (fixed), and the second lens unit L2 moves toward the image side. The third lens unit L3, the fourth lens unit L4, and the fifth lens unit L5 move toward the object side on different moving loci. The sixth lens unit L6 moves toward the object side and then moves to the image side. Thereby, the distance between the first lens unit L1 and the second lens unit L2 widens, and the distance between the second lens unit L2 and the third lens unit L3 narrows. The distance between the third lens unit L3 and the fourth lens unit L4 narrows, the distance between the fourth lens unit L4 and the fifth lens unit L5 widens, and the distance between the fifth lens unit L5 and the sixth lens unit L6 widens. During zooming from the wide-angle end to the telephoto end, the first lens unit L1, the third lens unit L3, the fourth lens unit L4, and the fifth lens unit L5 move toward the object side, and the second lens unit L2 moves toward the image side. Thereby, the overall lens length is reduced at the wide-angle end.

In this example, as illustrated in numerical example 5, which will be described below, the maximum image height at the telephoto end is set lower than the maximum image height at the wide-angle end. Thereby, the overall lens length at the telephoto end is reduced.

A description will now be given of numerical example 5 corresponding to Example 5. FIG. 21 illustrates the optical configuration of the optical system 101 according to numerical example 5 at the wide-angle end.

The optical system 101 according to numerical example 5 is a zoom lens having a magnification variation ratio of 35.71 (times) and an aperture ratio of about 4.00 to 8.00. In numerical example 5, the maximum image height at the wide-angle end is set to 5.00 mm, and the maximum image height at the telephoto end is set to 3.88 mm.

Figure 22:
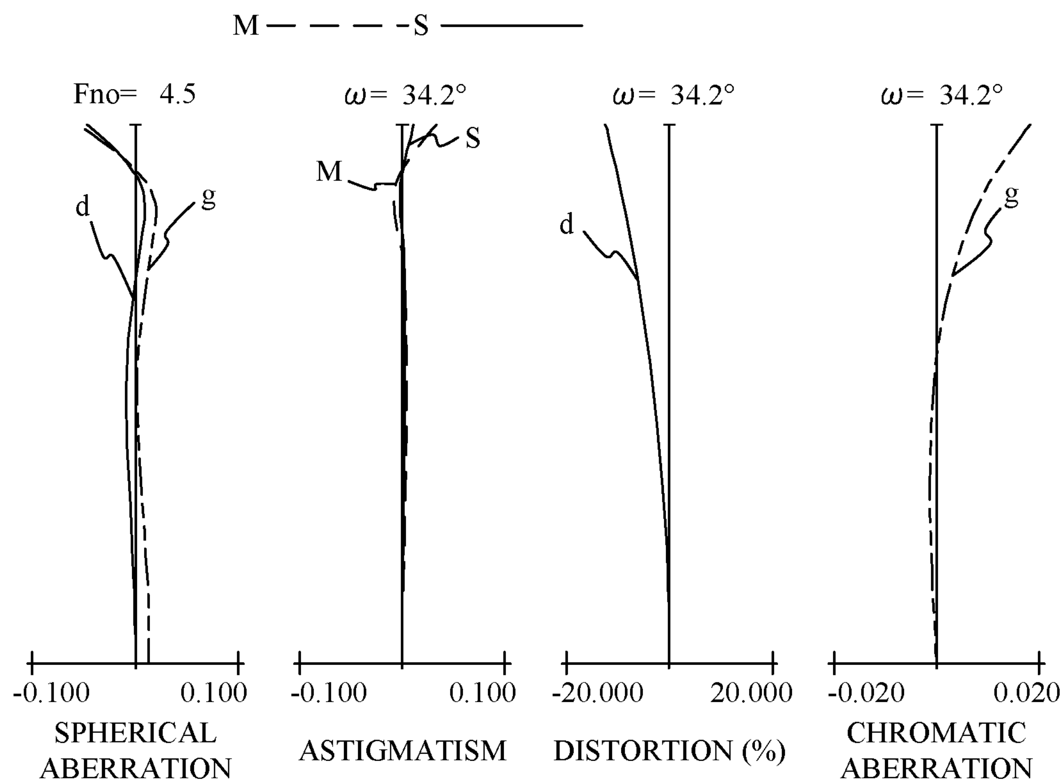
FIG. 22 is an aberration diagram at a wide-angle end in numerical example 5.
Figure 23:
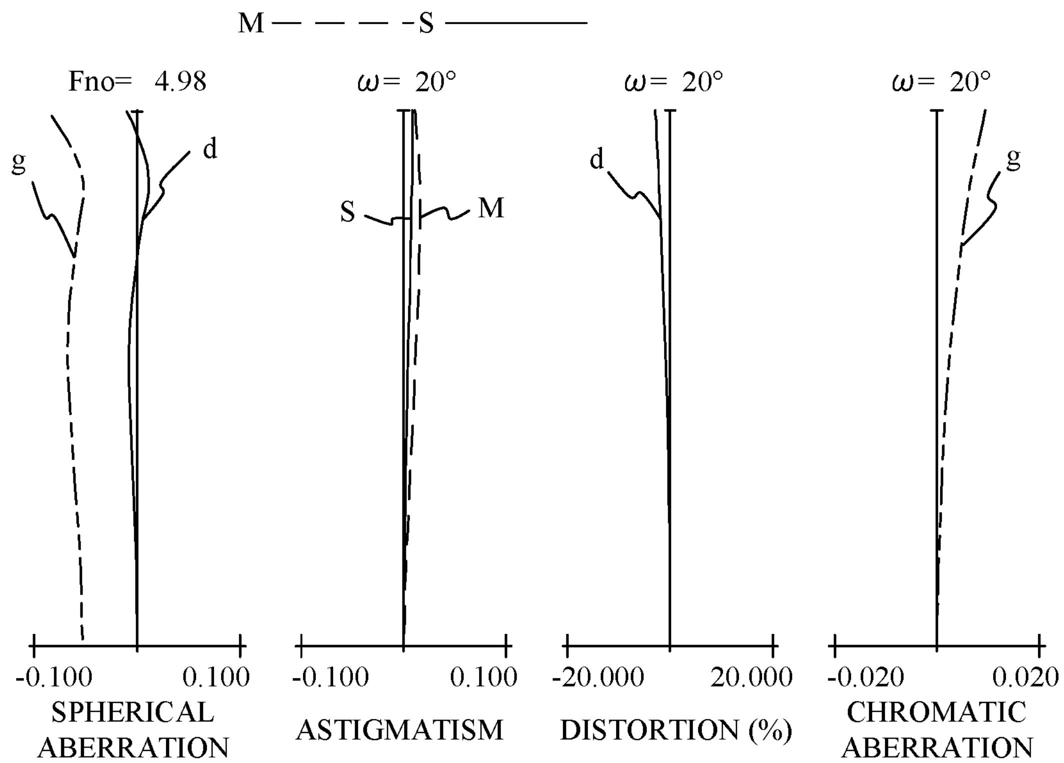
FIG. 23 is an aberration diagram at an intermediate zoom position in numerical example 5.
Figure 24:
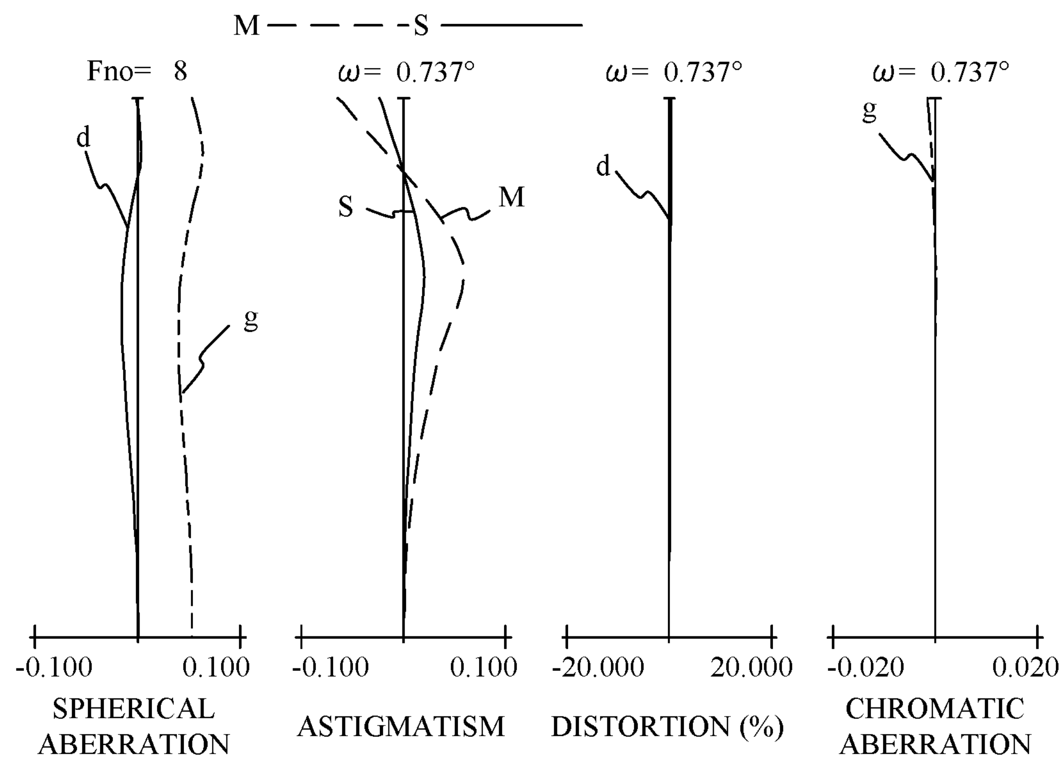
FIG. 24 is an aberration diagram at a telephoto end in numerical example 5.

FIGS. 22, 23, and 24 illustrate longitudinal aberrations (spherical aberration, astigmatism, distortion, and chromatic aberration) at the wide-angle end, intermediate zoom position, and telephoto end of the optical system 101 according to numerical example 5, respectively.

A description will now be given of a condition to be satisfied in order to realize the stereoscopic optical system 100 that has a compact size and a short overall lens length, and can acquire an image suitable for viewing on a VR display apparatus such as a head mount display.

Each of the optical systems 101 and 102 according to each numerical example satisfies the following inequality (1):

$$0.20 \leq (fT \cdot \theta T)/(fW \cdot \theta W) < 1.00 \quad (1)$$

where fW is a focal length at the wide-angle end of each optical system, fT is a focal length at the telephoto end of each optical system, θW is a maximum angle of view at the wide-angle end of each optical system, and θT is a maximum angle of view at the telephoto end of each optical system.

Inequality (1) defines a condition regarding the magnitude of change in focal length and the maximum angle of view from the wide-angle end to the telephoto end. In a case where the change in focal length is larger than the change in the maximum angle of view so that (fT·θT)/(fW·θW) is higher than the upper limit of inequality (1), the image circle diameter at the wide-angle end becomes larger than that at the telephoto end. As a result, in viewing an image on a VR display apparatus, an image display range corresponding to the image circle diameter becomes wider at the telephoto end than at the wide-angle end. However, at the telephoto end, a viewer often keeps his eyes on the target, and rarely moves his head to look for the target. Thus, a wide image display range at the telephoto end results in displaying unnecessary images other than the target image.

In a case where the image circle diameter at the telephoto end is larger than that at the wide-angle end, the overall length of the optical system at the telephoto end increases, and the stereoscopic optical system having two optical systems becomes large and heavy.

In a case where the change in focal length is smaller than the change in the maximum angle of view so that (fT·θT)/(fW·θW) is lower than the lower limit of inequality (1), the image circle diameter at the wide-angle end becomes much smaller than that at the telephoto end. The small image circle diameter at the telephoto end is beneficial to the size reduction of the optical system. However, as the diameter of the image circle at the telephoto end becomes smaller, the surrounding area where the image is not displayed is displayed with a black frame or the like in viewing an image on the VR display apparatus, and it becomes more difficult for the viewer to concentrate on the image than a case where an image is displayed in the entire viewing range of the viewer. In addition, in a case where the image circle diameter becomes smaller, the number of pixels for displaying an image becomes smaller, and the display resolution lowers.

Inequality (1) may be replaced with the following inequality (1a):

$$0.40 \leq (fT \cdot \theta T)/(fW \cdot \theta W) \leq 0.90 \quad (1a)$$

Inequality (1) may be replaced with the following inequality (1b):

$$0.50 \leq (fT \cdot \theta T)/(fW \cdot \theta W) \leq 0.85 \quad (1b)$$

Satisfying the configuration according to each example and the condition of inequality (1) enables a stereoscopic optical system having two optical systems to be small and to acquire a captured image suitable for viewing on a VR display apparatus. In addition, this configuration can realize a stereoscopic optical system that can be stored in a compact camera body.

The optical system according to each example may satisfy at least one of the following inequalities (2) to (11):

$$-15.0 \leq f1/f2 \leq -3.0 \quad (2)$$

$$0.05 \leq Dout/Din \leq 0.50 \quad (3)$$

$$-50.0 \leq fT/f2 \leq -10.0 \quad (4)$$

$$0.18 \leq BkW/LW \leq 0.50 \quad (5)$$

$$10.0 \leq LLW/fW \leq 20.0 \quad (6)$$

$$0.0 < f1/|f3| \leq 3.0 \quad (7)$$

$$2.0 \leq |f3|/fW \leq 300.0 \quad (8)$$

$$-15.0 \leq M3/fW \leq -2.0 \quad (9)$$

$$-1.0 \leq M1/LW < 0.0 \quad (10)$$

$$1.80 \leq Pnd \leq 2.10 \quad (11)$$

In inequalities (2) to (11), f1 is a focal length of the first lens unit L1. f2 is a focal length of the second lens unit L2. Din is a distance between the optical axes (base length) of the first lens units L1 in the optical systems 101 and 102. Dout is a distance between the optical axes of the reflective surfaces Rf2 in the optical systems 101 and 102. The distance between the optical axes of the reflective surfaces Rf2 is, in other words, a distance between the centers of the effective areas of the reflective surfaces Rf2 where the light reaching the image circle is incident. BkW is a back focus at the wide-angle end of each of the optical systems 101 and 102. LW is an overall lens length at the wide-angle end of each of the optical systems 101 and 102. LLW is an on-axis distance from a lens surface closest to the object to a lens surface closest to the image plane in each of the optical systems 101 and 102. f3 is a focal length of the third lens unit L3. M1 is a moving amount of the first lens unit L1 during zooming from the wide-angle end to the telephoto end. M3 is a moving amount of the third lens unit L3 during zooming from the wide-angle end to the telephoto end. The moving amount is positive in a case where the lens unit is located closer to the object at the telephoto end than at the wide-angle end, and negative in a case where the lens unit is located closer to the image plane at the telephoto end than at the wide-angle end. Pnd is a refractive index of a material of a prism as the optical member P for the d-line.

Inequality (2) defines a condition regarding a relationship between the focal length of the first lens unit L1 and the focal length of the second lens unit L2. In a case where the focal length of the first lens unit L1 becomes short so that f1/f2 is higher than the upper limit of inequality (2), spherical aberration increases at the telephoto end and the number of lenses required to correct the spherical aberration increases. In a case where the focal length of the first lens unit L1 becomes long so that f1/f2 is lower than the lower limit of inequality (2), it is beneficial to the correction of spherical aberration, but the overall lens length to satisfy the required focal length becomes longer.

Inequality (3) defines a condition regarding a relationship between the base length on the light incident sides of the two optical systems 101 and 102 and the distance between the optical axes on the exit side. Dout/Din that satisfies inequality (3) can reduce the size of the entire stereoscopic optical system while securing a sufficient base length. In a case where Dout/Din is lower than the lower limit of inequality (3), the distance between the optical members P becomes too short, and they may interfere with each other. Moreover, the base length becomes too long and the stereoscopic optical system becomes large, although a captured image can be acquired that is suitable for natural stereoscopic viewing of a distant object. In a case where Dout/Din is higher than the upper limit of inequality (3), the base length becomes too small, and a captured image suitable for natural stereoscopic viewing cannot be acquired.

Inequality (4) defines a condition regarding a relationship between the focal length of each optical system at the telephoto end and the focal length of the second lens unit L2. In a case where the focal length at the telephoto end becomes long such that fT/f2 is higher than the upper limit of inequality (4), the base length becomes insufficient for imaging of a long distance object, and it becomes difficult to acquire a captured image that is suitable for natural stereoscopic viewing. In a case where the focal length at the telephoto end is so short that fT/f2 is lower than the lower limit of inequality (4), a required focal length cannot be secured. In addition, in a case where the focal length of the second lens unit L2 becomes long so that fT/f2 is lower than the lower limit of inequality (4), a moving amount of the second lens unit L2 for zooming increases and the optical system becomes larger.

Inequality (5) defines a condition regarding a relationship between the overall lens length and the back focus at the wide-angle end. In a case where the back focus is long so that BkW/LW is higher than the upper limit of inequality (5), it is beneficial to the arrangement of the optical member P having the reflective surfaces Rf1 and Rf2 that guide light to a single image sensor, but the overall lens length becomes longer. In a case where the back focus is so short that BkW/LW is lower than the lower limit of inequality (5), it becomes difficult to secure the base length, and a captured image suitable for natural stereoscopic viewing cannot be acquired at the telephoto end.

Inequality (6) defines a condition regarding a relationship between the distance from the lens surface closest to the object (frontmost lens surface) to the lens surface closest to the image plane (final lens surface) in each optical system and the focal length of the optical system at the wide-angle end. This condition is a condition for achieving both a small size and optical performance in a zoom lens having a high magnification variation ratio. In a case where the distance from the frontmost lens surface to the final lens surface becomes long so that LLW/fW is higher than the upper limit value of inequality (6), the overall lens length becomes long. In a case where the distance from the frontmost lens surface to the final lens surface is short so that LLW/fW is lower than the lower limit of inequality (6), the refractive power of each lens becomes strong in order to obtain a zoom lens having a high magnification variation ratio and thus the optical performance deteriorates.

Inequality (7) defines a condition regarding a relationship between the focal lengths of the first lens unit L1 and the third lens unit L3. In a case where a light beam diameter in the optical member P is reduced in order to reduce the size of the optical member P while the back focus is secured, strong refraction cannot be obtained on the object side of the optical member P, and the focal length of the third lens unit L3 becomes longer. In a case where the focal length of the third lens unit L3 is so short that f1/|f3| is higher than the upper limit value of inequality (7), it becomes difficult to secure the back focus. The focal length of the third lens unit L3 that is long so that f1/|f3| is lower than the lower limit value of inequality (7) is beneficial to securing the back focus, but the focal length of the first lens unit L1 becomes short and the spherical aberration becomes significant at the telephoto end.

Inequality (8) defines a condition regarding a relationship between the focal length of the third lens unit L3 and the focal length at the wide-angle end of the optical system. In order to secure the back focus, the focal length of the third lens unit L3 becomes long. In a case where the focal length of the third lens unit L3 is long so that |f3|/fW is higher than the upper limit value of inequality (8), it is beneficial to securing the back focus, but the moving amount of the third lens unit L3 during zooming increases and the optical system becomes larger. In a case where the focal length of the third lens unit L3 is short so that |f3|/fW is lower than the lower limit of inequality (8), it becomes difficult to secure a sufficient back focus for arranging the optical member P.

Inequality (9) defines a condition regarding a relationship between the moving amount of the third lens unit L3 during zooming from the wide-angle end to the telephoto end and the focal length of the optical system at the wide-angle end. Moving the third lens unit L3 toward the object side during zooming from the wide-angle end to the telephoto end can reduce the size of the optical system while securing a high magnification variation ratio. In a case where the moving amount of the third lens unit L3 is small so that M3/fW is higher than the upper limit of inequality (9), the moving amounts of the other lens units to secure the necessary magnification variation ratio increase, and the overall lens length at the telephoto end becomes longer. In a case where the moving amount of the third lens unit L3 is large so that M3/fW is lower than the lower limit of inequality (9), it becomes easier to secure the necessary magnification variation ratio, but the overall lens length at the telephoto end becomes longer.

Inequality (10) defines a condition regarding a relationship between the moving amount of the first lens unit L1 during zooming from the wide-angle end to the telephoto end and the overall lens length at the wide-angle end in Examples 1 to 4. Moving the first lens unit L1 can reduce the size at the wide-angle end. In a case where the moving amount of the first lens unit L1 is large so that M1/LW is higher than the upper limit value of inequality (10), it is beneficial to miniaturization at the wide-angle end, but the overall lens length becomes longer at the telephoto end. In a case where the moving amount of the first lens unit L1 is small so that M1/LW is lower than the lower limit value of inequality (10), the focal length of each lens unit for securing the required magnification variation ratio becomes shorter, and it becomes difficult to correct spherical aberration and curvature of field.

Inequality (11) defines a condition regarding the refractive index of the prism disposed on the image side of the final lens surface. In a case where Pnd is higher than the upper limit of inequality (11), the back focus can be reduced, but such a high refractive index material does not exist. In a case where Pnd is lower than the lower limit of inequality (11), it becomes difficult to secure a back focus for avoiding interference between the prism and the final lens surface.

Inequalities (2) to (11) may be replaced with inequalities (2a) to (11a) as follows:

$$-12.0 \le f1/f2 \le -4.0 \quad (2a)$$

$$0.10 \le Dout/Din \le 0.45 \quad (3a)$$

$$-45.0 \le fT/f2 \le -15.0 \quad (4a)$$

$$0.185 \le BkW/LW \le 0.400 \quad (5a)$$

$$11.0 \le LLW/fW \le 19.0 \quad (6a)$$

$$0.0 < f1/|f3| \le 2.7 \quad (7a)$$

$$4.0 \le |f3|/fW \le 270.0 \quad (8a)$$

$$-12.0 \le M3/fW \le -3.0 \quad (9a)$$

$$-0.9 \le M1/LW < 0.0 \quad (10a)$$

$$1.85 \le Pnd \le 2.05 \quad (11a)$$

Inequalities (2) to (11) may be replaced with inequalities (2b) to (11b) as follows:

$$-10.0 \le f1/f2 \le -4.5 \quad (2b)$$

$$0.15 \le Dout/Din \le 0.40 \quad (3b)$$

$$-40.0 \le fT/f2 \le -20.0 \quad (4b)$$

$$0.19 \le BkW/LW \le 0.30 \quad (5b)$$

$$12.0 \le LLW/fW \le 18.0 \quad (6b)$$

$$0.0 < f1/|f3| \le 2.5 \quad (7b)$$

$$5.0 \le |f3|/fW \le 250.0 \quad (8b)$$

$$-10.0 \le M3/fW \le -4.0 \quad (9b)$$

$$-0.70 \le M1/LW < 0.0 \quad (10b)$$

$$1.87 \le Pnd \le 2.01 \quad (11b)$$

A description will now be given of numerical values in numerical examples 1 to 5. In each numerical example, a surface number i denotes the order of surfaces counted from the object side. r denotes a radius of curvature of an i-th surface from the object side (mm), d denotes a lens thickness or air gap (mm) between an i-th surface and an (i+1)-th surface, and nd denotes a refractive index for the d-line of an optical material between the i-th surface and the (i+1)-th surface. vd is an Abbe number based on the d-line of the optical material between the i-th surface and the (i+1)-th surface. The Abbe number vd of a certain material is expressed as follows:

$$vd=(Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

BF represents a back focus (mm). The back focus is a distance on the optical axis from the final lens surface to the paraxial image plane converted into an air conversion length. The overall lens length is a length obtained by adding the back focus to a distance on the optical axis from the frontmost lens surface to the final lens surface.

An asterisk "*" is attached to a surface number in a case where that surface has an aspherical shape. The aspherical shape is expressed as follows:

$$x=(h^2/R)/[1+\{1-(1+K)(h/R)^2\}^{1/2}]+A4h^4+A6h^6+A8h^8$$

where x is a displacement amount from a surface vertex in the optical axis direction, h is a height from the optical axis in a direction orthogonal to the optical axis, a light traveling direction is set positive, R is a paraxial radius of curvature, K is a conic constant and A4, A6, and A8 are aspherical coefficients. "e-X" in conic constants and aspheric coefficients means$\times 10^{-X}$.

Table 1 summarizes a relationship between each numerical example and inequalities (1) to (11). Each numerical example properly sets the refractive power of the third lens unit L3 and effectively corrects various off-axis aberrations, especially astigmatism, distortion, and spherical aberration and coma on the wide-angle side, by using an aspherical surface for the third lens unit L3 near the aperture stop SP.

Numerical Example 1

UNIT: mm

Surface Data

| Surface No. | r | d | nd | vd | Effective Diameter |
|---|---|---|---|---|---|
| 1 | 250.000 | 1.45 | 1.91082 | 35.3 | 47.54 |
| 2 | 57.764 | 5.96 | 1.49700 | 81.5 | 43.61 |
| 3 | −475.675 | 0.05 | | | 42.65 |
| 4 | 63.151 | 4.56 | 1.59410 | 60.5 | 43.20 |
| 5 | 710.617 | 0.05 | | | 42.99 |
| 6 | 81.595 | 3.14 | 1.59410 | 60.5 | 42.32 |
| 7 | 413.402 | (variable) | | | 42.00 |
| 8 | 157.816 | 0.60 | 1.88300 | 40.8 | 25.96 |
| 9 | 18.950 | 5.60 | | | 21.69 |
| 10 | −36.349 | 0.50 | 1.83481 | 42.7 | 20.99 |
| 11 | 19.317 | 0.16 | | | 19.97 |
| 12 | 20.113 | 2.79 | 1.98612 | 16.5 | 20.00 |
| 13 | 71.869 | (variable) | | | 19.79 |
| 14 (aperture stop) | ∞ | (variable) | | | 9.30 |
| 15* | 13.110 | 2.26 | 1.77047 | 29.7 | 9.43 |
| 16* | −36.732 | 0.20 | | | 9.15 |
| 17 | −27.101 | 0.60 | 1.83400 | 37.3 | 9.07 |
| 18 | 15.718 | (variable) | | | 8.75 |
| 19 | 108.649 | 0.60 | 1.80450 | 39.6 | 9.77 |
| 20 | 26.869 | 1.92 | 1.49700 | 81.5 | 9.79 |
| 21 | −25.364 | (variable) | | | 9.90 |
| 22 | 103.224 | 1.59 | 1.49700 | 81.5 | 9.90 |
| 23 | −22.125 | 0.50 | 1.85883 | 30.0 | 9.88 |
| 24 | −42.059 | (variable) | | | 9.93 |
| 25 | 84.352 | 1.76 | 1.49700 | 81.5 | 10.52 |
| 26 | −20.273 | 0.50 | 1.78590 | 43.9 | 10.60 |
| 27 | −35.010 | (variable) | | | 10.73 |
| 28 | ∞ | 10.50 | 2.00100 | 29.1 | 10.82 |
| 29 | ∞ | 21.00 | 2.00100 | 29.1 | 11.06 (PRS) |
| 30 | ∞ | 10.50 | 2.00100 | 29.1 | 11.54 (PRS) |
| 31 | ∞ | (variable) | | | 11.78 |
| Image Plane | ∞ | | | | |

*PRS = prism reflective surface

Aspheric Data

15th Surface

K = 2.84841e−001 A4 = −2.53821e−005 A6 = −4.85031e−007 A8 = 4.50616e−009

16th Surface

K = −3.53308e+001 A4 = −1.01064e−004 A6 = 5.15231e−007

Various Data

Zoom Ratio 35.71

| | Wide-Angle | Intermediate | Telephoto |
|---|---|---|---|
| Focal Length | 8.40 | 14.17 | 300.00 |
| FNo | 4.00 | 4.99 | 7.00 |
| Half Angle of View (°) | 40.7 | 15.7 | 0.74 |
| Image Height | 6.14 | 3.88 | 3.88 |
| Overall Lens Length | 138.99 | 132.68 | 188.99 |
| BF | 35.97 | 44.12 | 36.30 |
| d7 | 0.45 | 1.26 | 60.71 |
| d13 | 50.06 | 18.55 | 0.80 |
| d14 | 2.44 | 13.04 | −0.60 |
| d18 | 9.11 | 8.24 | 1.00 |

-continued

| UNIT: mm | | | |
|---|---|---|---|
| d21 | 2.46 | 1.01 | 2.64 |
| d24 | 3.72 | 11.67 | 53.35 |
| d27 | 1.50 | 9.65 | 1.83 |
| d31 | 13.48 | 13.48 | 13.48 |

Lens Unit Data

| Lens Unit | Starting Surface | Focal Length | Lens Structure Length | Front Principal Point Position | Rear Principal Point Position |
|---|---|---|---|---|---|
| 1 | 1 | 82.86 | 15.21 | 6.65 | −2.96 |
| 2 | 8 | −12.59 | 9.65 | 2.71 | −4.43 |
| 3 | 14 | ∞ | 0.00 | 0.00 | −0.00 |
| 4 | 15 | 356.78 | 3.06 | −40.74 | −38.18 |
| 5 | 19 | 63.95 | 2.52 | 1.79 | 0.17 |
| 6 | 22 | 112.08 | 2.09 | 1.11 | −0.23 |
| 7 | 25 | 71.00 | 2.26 | 1.14 | −0.33 |
| 8 | 28 | ∞ | 42.00 | 10.49 | −10.49 |

Single Lens Element Data

| Lens | Starting Surface | Focal Length |
|---|---|---|
| 1 | 1 | −82.77 |
| 2 | 2 | 104.03 |
| 3 | 4 | 116.36 |
| 4 | 6 | 170.51 |
| 5 | 8 | −24.44 |
| 6 | 10 | −15.05 |
| 7 | 12 | 27.58 |
| 8 | 15 | 12.79 |
| 9 | 17 | −11.85 |
| 10 | 19 | −44.52 |
| 11 | 20 | 26.58 |
| 12 | 22 | 36.81 |
| 13 | 23 | −54.99 |
| 14 | 25 | 33.07 |
| 15 | 26 | −62.21 |
| 16 | 28 | 0.00 |
| 17 | 29 | 0.00 |
| 18 | 30 | 0.00 |

Numerical Example 2

UNIT: mm

Surface Data

| Surface No. | r | d | nd | νd | Effective Diameter |
|---|---|---|---|---|---|
| 1 | 225.645 | 1.45 | 1.88300 | 40.8 | 57.50 |
| 2 | 76.242 | 7.23 | 1.43875 | 94.7 | 56.89 |
| 3 | −695.441 | 0.05 | | | 56.99 |
| 4 | 90.737 | 3.92 | 1.59410 | 60.5 | 57.49 |
| 5 | 255.011 | 0.05 | | | 57.32 |
| 6 | 72.431 | 6.53 | 1.43875 | 94.7 | 56.63 |
| 7 | 1226.200 | (variable) | | | 56.23 |
| 8 | ∞ | 0.60 | 1.88300 | 40.8 | 27.26 |
| 9 | 13.894 | 6.99 | | | 20.99 |
| 10 | −38.342 | 0.50 | 1.83481 | 42.7 | 20.67 |
| 11 | 48.578 | 0.10 | | | 20.80 |
| 12 | 29.509 | 2.64 | 1.98612 | 16.5 | 21.25 |
| 13 | 511.734 | (variable) | | | 21.12 |
| 14 (aperture stop) | ∞ | (variable) | | | 10.19 |
| 15* | 12.488 | 2.91 | 1.85135 | 40.1 | 12.02 |
| 16 | −65.537 | 0.60 | 1.81600 | 46.6 | 11.56 |
| 17 | 13.423 | 4.51 | | | 10.74 |
| 18 | 25.796 | 0.60 | 1.91650 | 31.6 | 10.48 |
| 19 | 11.934 | 3.48 | 1.49700 | 81.5 | 10.20 |
| 20 | −75.972 | (variable) | | | 10.16 |
| 21 | 50.210 | 2.44 | 1.72151 | 29.2 | 11.34 |
| 22 | −24.325 | 0.50 | 2.00330 | 28.3 | 11.40 |
| 23 | 206.752 | (variable) | | | 11.53 |

-continued

| UNIT: mm | | | | | |
|---|---|---|---|---|---|
| 24 | 49.292 | 2.18 | 1.51823 | 58.9 | 13.40 |
| 25 | −26.704 | 0.50 | 2.00330 | 28.3 | 13.47 |
| 26 | −38.850 | (variable) | | | 13.61 |
| 27 | ∞ | 10.50 | 1.88300 | 40.8 | 13.63 |
| 28 | ∞ | 21.00 | 1.88300 | 40.8 | 13.70 (PRS) |
| 29 | ∞ | 10.50 | 1.88300 | 40.8 | 13.84 (PRS) |
| 30 | ∞ | (variable) | | | 13.91 |
| Image Plane | ∞ | | | | |

Aspheric Data

15th Surface

K = 4.94066e−002 A4 = −1.95097e−005 A6 = −8.85474e−008 A8 = −1.20897e−009

Various Data

| Zoom Ratio | 54.76 | | |
|---|---|---|---|
| | Wide-Angle | Intermediate | Telephoto |
| Focal Length | 8.40 | 15.72 | 460.00 |
| FNo | 4.00 | 4.99 | 8.00 |
| Half Angle of View(°) | 47.1 | 14.2 | 0.48 |
| Image Height | 7.00 | 3.88 | 3.88 |
| Overall Lens Length | 162.86 | 137.46 | 249.33 |
| BF | 31.25 | 47.95 | 31.24 |
| d7 | 0.41 | 2.24 | 91.43 |
| d13 | 56.45 | 16.83 | 0.80 |
| d14 | 12.87 | 19.20 | −0.60 |
| d20 | 7.38 | 0.68 | 5.56 |
| d23 | 6.71 | 2.78 | 73.12 |
| d26 | 1.48 | 18.19 | 1.48 |
| d30 | 7.46 | 7.46 | 7.46 |

Lens Unit Data

| Lens Unit | Starting Surface | Focal Length | Lens Structure Length | Front Principal Point Position | Rear Principal Point Position |
|---|---|---|---|---|---|
| 1 | 1 | 115.06 | 19.23 | 7.38 | −5.49 |
| 2 | 8 | −13.55 | 10.83 | 0.95 | −7.81 |
| 3 | 14 | ∞ | 0.00 | 0.00 | −0.00 |
| 4 | 15 | 46.66 | 12.10 | −2.69 | −11.81 |
| 5 | 21 | −578.40 | 2.94 | 14.19 | 12.22 |
| 6 | 24 | 55.23 | 2.68 | 0.97 | −0.73 |
| 7 | 27 | ∞ | 42.00 | 11.15 | −11.15 |

Single Lens Element Data

| Lens | Starting Surface | Focal Length |
|---|---|---|
| 1 | 1 | −131.00 |
| 2 | 2 | 157.05 |
| 3 | 4 | 235.00 |
| 4 | 6 | 175.15 |
| 5 | 8 | −15.73 |
| 6 | 10 | −25.60 |
| 7 | 12 | 31.67 |
| 8 | 15 | 12.54 |
| 9 | 16 | −13.61 |
| 10 | 18 | −24.74 |
| 11 | 19 | 21.03 |
| 12 | 21 | 23.03 |
| 13 | 22 | −21.67 |
| 14 | 24 | 33.75 |
| 15 | 25 | −86.92 |
| 16 | 27 | 0.00 |
| 17 | 28 | 0.00 |
| 18 | 29 | 0.00 |

Numerical Example 3

UNIT: mm

Surface Data

| Surface No. | r | d | nd | νd | Effective Diameter |
|---|---|---|---|---|---|
| 1 | 225.739 | 1.45 | 1.88300 | 40.8 | 57.50 |
| 2 | 80.794 | 6.74 | 1.43875 | 94.7 | 56.92 |
| 3 | −852.645 | 0.05 | | | 57.00 |
| 4 | 89.324 | 4.23 | 1.59410 | 60.5 | 57.41 |
| 5 | 290.699 | 0.05 | | | 57.23 |
| 6 | 91.372 | 5.23 | 1.43875 | 94.7 | 56.59 |
| 7 | 1659.513 | (variable) | | | 56.26 |
| 8 | ∞ | 0.60 | 1.88300 | 40.8 | 29.29 |
| 9 | 15.059 | 7.11 | | | 22.70 |
| 10 | −50.938 | 0.00 | 1.83481 | 42.7 | 22.44 |
| 11 | −50.938 | 0.50 | 1.83481 | 42.7 | 22.44 |
| 12 | 57.526 | 0.10 | | | 22.45 |
| 13 | 28.847 | 2.63 | 1.98612 | 16.5 | 22.94 |
| 14 | 103.741 | (variable) | | | 22.72 |
| 15 (aperture stop) | ∞ | (variable) | | | 10.20 |
| 16* | 15.517 | 2.96 | 1.72151 | 29.2 | 11.99 |
| 17 | −20.474 | 0.60 | 1.80440 | 39.6 | 11.78 |
| 18 | 20.227 | (variable) | | | 11.35 |
| 19 | 31.816 | 0.60 | 1.89286 | 20.4 | 11.98 |
| 20 | 16.429 | 3.13 | 1.49700 | 81.5 | 11.85 |
| 21 | −26.512 | (variable) | | | 11.93 |
| 22 | 50.597 | 1.49 | 1.95906 | 17.5 | 11.10 |
| 23 | −360.877 | 0.50 | 2.00272 | 19.3 | 10.90 |
| 24 | 34.178 | (variable) | | | 10.85 |
| 25 | 50.730 | 1.62 | 1.54814 | 45.8 | 12.26 |
| 26 | −36.239 | 0.50 | 2.00330 | 28.3 | 12.30 |
| 27 | −57.411 | (variable) | | | 12.39 |
| 28 | ∞ | 10.50 | 1.88300 | 40.8 | 12.45 |
| 29 | ∞ | 21.00 | 1.88300 | 40.8 | 12.69 (PRS) |
| 30 | ∞ | 10.50 | 1.88300 | 40.8 | 13.18 (PRS) |
| 31 | ∞ | (variable) | | | 13.42 |
| Image Plane | ∞ | | | | |

Aspheric Data

16th Surface

K= 6.53768e−001 A4 = −3.64011e−005 A6 = −8.84890e−008 A8 = −1.33269e−009

Various Data

Zoom Ratio 54.76

| | Wide-Angle | Intermediate | Telephoto |
|---|---|---|---|
| Focal Length | 8.40 | 17.07 | 460.00 |
| FNo | 4.00 | 4.98 | 8.00 |
| Half Angle of View(°) | 46.5 | 13.0 | 0.48 |
| Image Height | 7.00 | 3.88 | 3.88 |
| Overall Lens Length | 165.87 | 142.12 | 266.98 |
| BF | 36.79 | 52.37 | 38.51 |
| d7 | 0.60 | 0.79 | 98.00 |
| d14 | 61.29 | 16.90 | 0.80 |
| d15 | 12.57 | 19.88 | −0.60 |
| d18 | 6.19 | 5.13 | 3.10 |
| d21 | 2.46 | 4.90 | 3.61 |
| d24 | 5.89 | 2.05 | 83.47 |
| d27 | 1.00 | 16.58 | 2.72 |
| d31 | 13.48 | 13.48 | 13.48 |

Lens Unit Data

| Lens Unit | Starting Surface | Focal Length | Lens Structure Length | Front Principal Point Position | Rear Principal Point Position |
|---|---|---|---|---|---|
| 1 | 1 | 123.44 | 17.75 | 6.76 | −5.07 |
| 2 | 8 | −14.78 | 10.94 | 1.06 | −7.69 |
| 3 | 15 | ∞ | 0.00 | 0.00 | −0.00 |
| 4 | 16 | 148.14 | 3.56 | −13.13 | −13.95 |
| 5 | 19 | 44.25 | 3.73 | 1.67 | −0.78 |
| 6 | 22 | −100.59 | 1.99 | 2.99 | 1.92 |

-continued

| UNIT: mm | | | | | |
|---|---|---|---|---|---|
| 7 | 25 | 63.81 | 2.12 | 0.61 | −0.70 |
| 8 | 28 | ∞ | 42.00 | 11.15 | −11.15 |

| Single Lens Element Data | | |
|---|---|---|
| Lens | Starting Surface | Focal Length |
| 1 | 1 | −143.17 |
| 2 | 2 | 168.58 |
| 3 | 4 | 215.36 |
| 4 | 6 | 220.17 |
| 5 | 8 | −17.05 |
| 6 | 10 | 0.00 |
| 7 | 11 | −32.29 |
| 8 | 13 | 39.83 |
| 9 | 16 | 12.67 |
| 10 | 17 | −12.57 |
| 11 | 19 | −38.76 |
| 12 | 20 | 20.92 |
| 13 | 22 | 46.35 |
| 14 | 23 | −31.12 |
| 15 | 25 | 38.82 |
| 16 | 26 | −99.12 |
| 17 | 28 | 0.00 |
| 18 | 29 | 0.00 |
| 19 | 30 | 0.00 |

Numerical Example 4

| UNIT: mm | | | | | |
|---|---|---|---|---|---|
| Surface Data | | | | | |
| Surface No. | r | d | nd | νd | Effective Diameter |
| 1 | 250.000 | 1.45 | 1.91650 | 31.6 | 50.00 |
| 2 | 67.240 | 6.00 | 1.49700 | 81.5 | 49.53 |
| 3 | −2882.950 | 0.05 | | | 49.64 |
| 4 | 76.989 | 5.54 | 1.59410 | 60.5 | 50.26 |
| 5 | −1443.590 | 0.05 | | | 50.07 |
| 6 | 64.883 | 4.23 | 1.59410 | 60.5 | 48.61 |
| 7 | 202.613 | (variable) | | | 48.16 |
| 8 | ∞ | 0.60 | 1.88300 | 40.8 | 23.03 |
| 9 | 15.853 | 4.46 | | | 18.70 |
| 10 | −46.712 | 0.50 | 1.83481 | 42.7 | 18.20 |
| 11 | 17.864 | 0.10 | | | 17.19 |
| 12 | 17.891 | 2.43 | 1.98612 | 16.5 | 17.24 |
| 13 | 62.235 | (variable) | | | 16.97 |
| 14 (aperture stop) | ∞ | (variable) | | | 10.16 |
| 15* | 20.941 | 2.63 | 1.72151 | 29.2 | 10.16 |
| 16* | −15.346 | 0.20 | | | 10.05 |
| 17 | −13.050 | 0.60 | 1.88300 | 40.8 | 9.98 |
| 18 | 49.433 | (variable) | | | 10.02 |
| 19 | 105.779 | 0.60 | 1.90043 | 37.4 | 14.34 |
| 20 | 29.575 | 3.35 | 1.49700 | 81.5 | 14.60 |
| 21 | −25.138 | (variable) | | | 15.12 |
| 22 | 102.184 | 3.58 | 1.49700 | 81.5 | 16.32 |
| 23 | −17.618 | 0.50 | 2.00330 | 28.3 | 16.50 |
| 24 | −28.100 | (variable) | | | 16.96 |
| 25 | 125.370 | 2.66 | 1.72000 | 46.0 | 17.54 |
| 26 | −25.344 | 0.50 | 1.95375 | 32.3 | 17.55 |
| 27 | −52.446 | (variable) | | | 17.67 |
| 28 | ∞ | 10.50 | 2.00100 | 29.1 | 17.06 |
| 29 | ∞ | 21.00 | 2.00100 | 29.1 | 16.31 (PRS) |
| 30 | ∞ | 10.50 | 2.00100 | 29.1 | 14.80 (PRS) |
| 31 | ∞ | (variable) | | | 14.05 |
| Image Plane | ∞ | | | | |

-continued

| UNIT: mm | | | |
|---|---|---|---|
| Aspheric Data | | | |
| 15th Surface | | | |
| K = 1.23523e−001 | A4 = 5.66665e−006 | A6 = −2.48467e−007 | A8 = 2.03336e−008 |
| 16th Surface | | | |
| K = −6.41497e+000 | A4 = −2.60436e−004 | A6 = 1.50124e−006 | |

Various Data

| Zoom Ratio | 33.33 | | |
|---|---|---|---|
| | Wide-Angle | Intermediate | Telephoto |
| Focal Length | 7.50 | 13.63 | 250.00 |
| FNo | 4.00 | 4.99 | 5.00 |
| Half Angle of View(°) | 45.4 | 16.3 | 0.89 |
| Image Height | 6.14 | 3.88 | 3.88 |
| Overall Lens Length | 138.35 | 132.90 | 196.23 |
| BF | 35.97 | 45.85 | 41.67 |
| d7 | 0.60 | 1.54 | 61.66 |
| d13 | 33.29 | 12.34 | 1.10 |
| d14 | 13.12 | 11.89 | −0.60 |
| d18 | 9.38 | 8.69 | 2.38 |
| d21 | 2.42 | 1.06 | 8.88 |
| d24 | 3.55 | 11.50 | 41.11 |
| d27 | 3.50 | 13.38 | 9.20 |
| d31 | 11.48 | 11.48 | 11.48 |

Lens Unit Data

| Lens Unit | Starting Surface | Focal Length | Lens Structure Length | Front Principal Point Position | Rear Principal Point Position |
|---|---|---|---|---|---|
| 1 | 1 | 82.86 | 17.32 | 6.73 | −4.21 |
| 2 | 8 | −11.33 | 8.09 | 1.79 | −4.14 |
| 3 | 14 | ∞ | 0.00 | 0.00 | −0.00 |
| 4 | 15 | −1714.51 | 3.43 | 138.36 | 126.13 |
| 5 | 19 | 67.34 | 3.95 | 3.12 | 0.59 |
| 6 | 22 | 83.62 | 4.08 | 2.19 | −0.48 |
| 7 | 25 | 68.30 | 3.16 | 1.27 | −0.55 |
| 8 | 28 | ∞ | 42.00 | 10.49 | −10.49 |

Single Lens Element Data

| Lens | Starting Surface | Focal Length |
|---|---|---|
| 1 | 1 | −100.74 |
| 2 | 2 | 132.30 |
| 3 | 4 | 123.20 |
| 4 | 6 | 158.84 |
| 5 | 8 | −17.95 |
| 6 | 10 | −15.42 |
| 7 | 12 | 24.79 |
| 8 | 15 | 12.66 |
| 9 | 17 | −11.64 |
| 10 | 19 | −45.76 |
| 11 | 20 | 27.91 |
| 12 | 22 | 30.54 |
| 13 | 23 | −48.22 |
| 14 | 25 | 29.50 |
| 15 | 26 | −51.89 |
| 16 | 28 | 0.00 |
| 17 | 29 | 0.00 |
| 18 | 30 | 0.00 |

Numerical Example 5

UNIT: mm

Surface Data

| Surface No. | r | d | nd | vd | Effective Diameter |
|---|---|---|---|---|---|
| 1 | 327.452 | 1.45 | 1.88300 | 40.8 | 41.41 |
| 2 | 67.772 | 4.97 | 1.43875 | 94.7 | 38.86 |
| 3 | −195.110 | 0.05 | | | 37.98 |
| 4 | 72.370 | 3.19 | 1.59410 | 60.5 | 37.71 |
| 5 | 637.277 | 0.05 | | | 37.55 |
| 6 | 55.015 | 4.08 | 1.43875 | 94.7 | 36.92 |
| 7 | 781.047 | (variable) | | | 36.52 |
| 8 | 259.425 | 0.60 | 1.88300 | 40.8 | 24.86 |
| 9 | 22.644 | 5.41 | | | 21.78 |
| 10 | −30.206 | 0.00 | 1.83481 | 42.7 | 21.13 |
| 11 | −30.206 | 0.50 | 1.83481 | 42.7 | 21.13 |
| 12 | 32.153 | 0.10 | | | 20.81 |
| 13 | 32.332 | 2.22 | 1.98612 | 16.5 | 20.86 |
| 14 | 219.672 | (variable) | | | 20.77 |
| 15 (aperture stop) | ∞ | (variable) | | | 10.38 |
| 16* | 14.644 | 2.61 | 1.64769 | 33.8 | 10.67 |
| 17* | ∞ | 0.29 | | | 10.32 |
| 18 | 479.309 | 0.60 | 1.75500 | 52.3 | 10.18 |
| 19 | 16.843 | (variable) | | | 9.87 |
| 20 | 57.294 | 0.60 | 1.67300 | 38.3 | 10.40 |
| 21 | 18.218 | 3.49 | 1.49700 | 81.5 | 10.35 |
| 22 | −36.449 | (variable) | | | 10.40 |
| 23 | 15.594 | 1.29 | 1.72825 | 28.5 | 9.97 |
| 24 | 30.079 | 0.50 | 1.95906 | 17.5 | 9.67 |
| 25 | 16.174 | (variable) | | | 9.39 |
| 26 | 53.973 | 1.33 | 1.59551 | 39.2 | 9.98 |
| 27 | −26.585 | 0.50 | 1.90525 | 35.0 | 9.99 |
| 28 | −59.565 | (variable) | | | 10.06 |
| 29 | ∞ | 10.50 | 1.88300 | 40.8 | 10.05 |
| 30 | ∞ | 21.00 | 1.88300 | 40.8 | 10.05 (PRS) |
| 31 | ∞ | 10.50 | 1.88300 | 40.8 | 10.03 (PRS) |
| 32 | ∞ | (variable) | | | 10.03 |
| Image Plane | ∞ | | | | |

Aspheric Data

16th Surface

K = 5.29581e−001 A4 = −3.59219e−005 A6 = −9.52171e−007 A8 = −5.89270e−009

17th Surface

K = −1.28946e+020 A4 = −7.96700e−008 A6 = −1.09581e−006

Various Data

Zoom Ratio 35.71

| | Wide-Angle | Intermediate | Telephoto |
|---|---|---|---|
| Focal Length | 8.40 | 10.99 | 300.00 |
| FNo | 4.50 | 4.98 | 8.00 |
| Half Angle of View(°) | 34.2 | 20.0 | 0.74 |
| Image Height | 5.00 | 3.88 | 3.88 |
| Overall Lens Length | 186.95 | 186.95 | 186.95 |
| BF | 37.30 | 38.31 | 37.30 |
| d7 | 0.45 | 6.42 | 52.28 |
| d14 | 89.09 | 78.34 | 1.31 |
| d15 | 2.16 | 1.48 | −0.60 |
| d19 | 12.07 | 11.76 | 1.00 |
| d22 | 2.46 | 6.60 | 3.00 |
| d25 | 9.59 | 10.21 | 58.83 |
| d28 | 1.50 | 2.51 | 1.50 |
| d32 | 13.50 | 13.50 | 13.50 |

Lens Unit Data

| Lens Unit | Starting Surface | Focal Length | Lens Structure Length | Front Principal Point Position | Rear Principal Point Position |
|---|---|---|---|---|---|
| 1 | 1 | 75.66 | 13.79 | 5.97 | −3.14 |
| 2 | 8 | −14.60 | 8.83 | 2.55 | −4.24 |

-continued

| UNIT: mm | | | | | |
|---|---|---|---|---|---|
| 3 | 15 | ∞ | 0.00 | 0.00 | −0.00 |
| 4 | 16 | 189.83 | 3.50 | −18.30 | −18.71 |
| 5 | 20 | 63.95 | 4.09 | 2.13 | −0.59 |
| 6 | 23 | −434.37 | 1.79 | 23.27 | 21.14 |
| 7 | 26 | 68.73 | 1.83 | 0.48 | −0.62 |
| 8 | 29 | ∞ | 42.00 | 11.15 | −11.15 |

Single Lens Element Data

| Lens | Starting Surface | Focal Length |
|---|---|---|
| 1 | 1 | −97.04 |
| 2 | 2 | 115.31 |
| 3 | 4 | 137.13 |
| 4 | 6 | 134.66 |
| 5 | 8 | −28.13 |
| 6 | 10 | 0.00 |
| 7 | 11 | −18.59 |
| 8 | 13 | 38.22 |
| 9 | 16 | 22.61 |
| 10 | 18 | −23.13 |
| 11 | 20 | −39.94 |
| 12 | 21 | 24.97 |
| 13 | 23 | 42.86 |
| 14 | 24 | −37.14 |
| 15 | 26 | 30.10 |
| 16 | 27 | −53.42 |
| 17 | 29 | 0.00 |
| 18 | 30 | 0.00 |
| 19 | 31 | 0.00 |

TABLE 1

| | Inequality | Inequality Range | | Ex. 1 | Ex. 2 | Ex. 3 | Ex. 4 | Ex. 5 |
|---|---|---|---|---|---|---|---|---|
| (1) | (fT · θT)/(fW · θW) | 0.20 | 1.00 | 0.65 | 0.56 | 0.57 | 0.65 | 0.77 |
| | fW | | | 8.40 | 8.40 | 8.40 | 7.50 | 8.40 |
| | fT | | | 300.00 | 460.00 | 460.00 | 250.00 | 300.00 |
| | θW | | | 40.70 | 47.10 | 46.50 | 45.40 | 34.20 |
| | θT | | | 0.74 | 0.48 | 0.48 | 0.89 | 0.74 |
| (2) | f1/f2 | −15.0 | −3.0 | −6.58 | −8.49 | −8.35 | −7.31 | −5.18 |
| | f1 | | | 82.86 | 115.06 | 123.44 | 82.86 | 75.66 |
| | f2 | | | −12.59 | −13.55 | −14.78 | −11.33 | −14.60 |
| (3) | Dout/Din | 0.05 | 0.5 | 0.30 | 0.35 | 0.35 | 0.23 | 0.19 |
| | Dout | | | 18.00 | 23.00 | 23.00 | 12.30 | 10.00 |
| | Din | | | 60.00 | 65.00 | 65.00 | 54.30 | 52.00 |
| (4) | fT/f2 | −50.0 | −10.0 | −23.83 | −33.94 | −31.12 | −22.06 | −20.54 |
| (5) | BkW/LW | 0.180 | 0.500 | 0.26 | 0.19 | 0.22 | 0.26 | 0.20 |
| | BkW(in air) | | | 35.97 | 31.25 | 36.79 | 35.97 | 37.30 |
| | LW(in air) | | | 138.99 | 162.86 | 165.87 | 138.35 | 186.95 |
| (6) | LLW/fW | 10.0 | 20.0 | 12.26 | 15.67 | 15.37 | 13.65 | 17.82 |
| | LLW | | | 103.03 | 131.61 | 129.09 | 102.39 | 149.65 |
| (7) | f1/\|f3\| | 0.0 | 3.0 | 0.23 | 2.47 | 0.83 | 0.05 | 0.40 |
| | f3 | | | 356.78 | 46.66 | 148.14 | −1714.51 | 189.83 |
| (8) | \|f3\|/fW | 2.0 | 300.0 | 42.47 | 5.56 | 17.64 | 228.60 | 22.60 |
| (9) | M3/fW | −15.0 | −2.0 | −5.00 | −7.69 | −9.21 | −5.70 | −4.61 |
| | M3 | | | −42.04 | −64.58 | −77.36 | −42.72 | −38.72 |
| (10) | M1/LW | −1.0 | 0.0 | −0.36 | −0.53 | −0.61 | −0.42 | 0.00 |
| | M1 | | | −50.00 | 86.47 | −101.11 | −57.88 | 0.00 |
| (11) | Pnd | 1.80 | 2.10 | 2.001 | 1.883 | 1.883 | 2.001 | 2.001 |

Each of the above examples can provide a stereoscopic optical system that is compact and zoomable.

While the disclosure has been described with reference to examples, it is to be understood that the disclosure is not limited to the disclosed examples. The scope of the following claims is to be accorded the broadest interpretation so as to encompass all such modifications and equivalent structures and functions.

This application claims the benefit of Japanese Patent Application No. 2022-085440, filed on May 25, 2022, which is hereby incorporated by reference herein in its entirety.

What is claimed is:

1. A stereoscopic optical system comprising two optical systems, wherein each of the two optical systems includes a plurality of lens units and two reflective surfaces disposed on an image side of the plurality of lens units, wherein a distance between adjacent lens units in each of the two optical systems changes during zooming, wherein a distance between optical axes of the two optical systems is narrower on the image side of the two reflective surfaces than on an object side of the two reflective surfaces, and wherein the following inequality is satisfied for each of the two optical systems:

$$0.20 \le (fT \cdot \theta T)/(fW \cdot \theta W) < 1.00$$

where fW is a focal length at a wide-angle end of each of the two optical systems, fT is a focal length at a telephoto end of each of the two optical systems, θW is a maximum angle of view at the wide-angle end of each of the two optical systems, and θT is a maximum angle of view at the telephoto end of each of the two optical systems.

2. The stereoscopic optical system according to claim 1, wherein the plurality of lens units include, in order from the object side to the image side, a first lens unit having positive refractive power, and a second lens unit having negative refractive power.

3. The stereoscopic optical system according to claim 2, wherein the following inequality is satisfied:

$$-15.0 \le f1/f2 \le -3.0$$

where f1 is a focal length of the first lens unit, and f2 is a focal length of the second lens unit.

4. The stereoscopic optical system according to claim 1, wherein the following inequality is satisfied:

$$0.05 \le Dout/Din \le 0.50$$

where Din is a distance between optical axes on the object side of the two reflective surfaces, and Dout is a distance between the optical axes on the image side of the two reflective surfaces.

5. The stereoscopic optical system according to claim 2, wherein the following inequality is satisfied:

$$-50.0 \le fT/f2 \le -10.0$$

where f2 is a focal length of the second lens unit.

6. The stereoscopic optical system according to claim 1, wherein the following inequality is satisfied:

$$0.18 \le BkW/LW \le 0.50$$

where BkW is a back focus at the wide-angle end of each of the two optical systems, and LW is an overall lens length at the wide-angle end of each of the two optical systems.

7. The stereoscopic optical system according to claim 1, wherein the following inequality is satisfied:

$$10.0 \le LLW/fW \le 20.0$$

where LLW is a distance on an optical axis from a lens surface closest to an object to a lens surface closest to an image plane in the plurality of lens units.

8. The stereoscopic optical system according to claim 1, wherein the plurality of lens units includes, in order from the object side to the image side, a first lens unit having positive refractive power, a second lens unit having negative refractive power, and a third lens unit having positive or negative power.

9. The stereoscopic optical system according to claim 8, wherein the following inequality is satisfied:

$$0.0 < f1/|f3| \le 3.0$$

where f3 is a focal length of the third lens unit.

10. The stereoscopic optical system according to claim 9, wherein the following inequality is satisfied:

$$2.0 \le |f3|/fW \le 300.0.$$

11. The stereoscopic optical system according to claim 8, wherein the third lens unit moves toward the object side during zooming from the wide-angle end to the telephoto end.

12. The stereoscopic optical system according to claim 11, wherein the following inequality is satisfied:

$$-15.0 \le M3/fW \le -2.0$$

where M1 is a moving amount of the third lens unit during zooming from the wide-angle end to the telephoto end, and the moving amount of the third lens unit toward the object side is positive.

13. The stereoscopic optical system according to claim 2, wherein the first lens unit moves toward the object side during zooming from the wide-angle end to the telephoto end.

14. The stereoscopic optical system according to claim 13, wherein the following inequality is satisfied:

$$-1.0 \le M1/LW < 0.0$$

where M1 is a moving amount of the first lens unit during zooming from the wide-angle end to the telephoto end, and the moving amount of the first lens unit toward the object side is positive.

15. The stereoscopic optical system according to claim 2, wherein the first lens unit includes, in order from the object side to the image side, a cemented lens of a negative lens and a positive lens, a positive lens, and a positive lens.

16. The stereoscopic optical system according to claim 1, wherein the two reflective surfaces are provided to an optical member disposed between a lens surface closest to an object and an image plane in the plurality of lens units.

17. The stereoscopic optical system according to claim 16, wherein the following inequality is satisfied:

$$1.80 \le Pnd \le 2.10$$

where Pnd is a refractive index of the optical member for d-line.

18. The stereoscopic optical system according to claim 1, wherein no lens unit is located between the two reflective surfaces or between one of the two reflective surfaces that is closer to an image plane and the image plane.

19. An image pickup apparatus comprising:

a stereoscopic optical system including two optical systems disposed in parallel; and an image sensor configured to capture two optical images formed by the stereoscopic optical system, wherein each of the two optical systems includes a plurality of lens units and two reflective surfaces disposed on an image side of the plurality of lens units, wherein a distance between adjacent lens units in each of the two optical systems changes during zooming, wherein a distance between optical axes of the two optical systems is narrower on the image side of the two reflective surfaces than on an object side of the two reflective surfaces, and wherein the following inequality is satisfied for each of the two optical systems:

$$0.20 \le (fT \cdot \theta T)/(fW \cdot \theta W) < 1.00$$

where fW is a focal length at a wide-angle end of each of the two optical systems, fT is a focal length at a telephoto end of each of the two optical systems, θW is a maximum angle of view at the wide-angle end of each of the two optical systems, and θT is a maximum angle of view at the telephoto end of each of the two optical systems.

* * * * *